(12) United States Patent
Meure et al.

(10) Patent No.: US 10,632,718 B2
(45) Date of Patent: Apr. 28, 2020

(54) FILAMENT NETWORK FOR A COMPOSITE STRUCTURE

(71) Applicant: The Boeing Company, Chicago, IL (US)

(72) Inventors: Sam Meure, Heatherton (AU); Christopher A. Howe, Albert Park (AU); Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/501,125

(22) Filed: Sep. 30, 2014

(65) Prior Publication Data

US 2016/0089853 A1 Mar. 31, 2016

(51) Int. Cl.
*B32B 5/26* (2006.01)
*D04H 13/00* (2006.01)
(Continued)

(52) U.S. Cl.
CPC ............... *B32B 5/26* (2013.01); *B32B 37/18* (2013.01); *B32B 38/08* (2013.01); *D04H 13/00* (2013.01);
(Continued)

(58) Field of Classification Search
CPC .......... B32B 5/26; B32B 37/18; B32B 38/08; B32B 2260/046; B32B 2605/18;
(Continued)

(56) References Cited

U.S. PATENT DOCUMENTS 4,770,929 A * 9/1988 Nobumasa ................ B32B 5/28
428/367
5,272,000 A * 12/1993 Chenoweth .............. D04H 1/42
442/35
(Continued)

FOREIGN PATENT DOCUMENTS

CN 101331255 12/2008
EP 0 352 888 1/1990
(Continued)

OTHER PUBLICATIONS

Yudong et al. "Continuous Monitoring of Resin Content in Composite Prepreg Narrow Tapes," Eleventh Proceedings of International Conference on Composite Materials, vol. VI, pp. 217-278, 1997.*
(Continued)

*Primary Examiner* — Michael Zhang
(74) *Attorney, Agent, or Firm* — Walters & Wasylyna LLC

(57) ABSTRACT

A filament network for a composite structure may include a number of fiber layers, wherein each fiber layer includes a fiber bundle and a filament layer at least partially covering the fiber bundle, the filament layer including discontinuous filaments including at least one of different length filaments including first length filaments and second length filaments, wherein the first length filaments include a first length and the second length filaments include a second length, and wherein the first length is different than the second length and different type filaments including first type filaments and second type filaments, wherein the first type filaments include a first material composition, wherein the second type filaments include a second material composition, and wherein the first material composition is different that the
(Continued)

second material composition, and a resin binding the number of fiber layers together.

20 Claims, 8 Drawing Sheets

(51) Int. Cl.
    *B29C 70/34*     (2006.01)
    *B32B 37/18*     (2006.01)
    *B32B 38/08*     (2006.01)
    *B29L 9/00*     (2006.01)
    *B29L 31/30*     (2006.01)

(52) U.S. Cl.
    CPC ... *B29L 2009/00* (2013.01); *B29L 2031/3076* (2013.01); *B32B 2260/046* (2013.01); *B32B 2605/18* (2013.01)

(58) Field of Classification Search
    CPC ...... D04H 13/00; D04H 1/4382; B29C 70/34; B29C 70/30; B29L 2031/3076; B29L 2009/00
    See application file for complete search history.

(56) References Cited

U.S. PATENT DOCUMENTS

| | | | | |
|---|---|---|---|---|
| 5,458,960 | A * | 10/1995 | Nieminen | B32B 27/12 28/107 |
| 5,484,652 | A * | 1/1996 | Strunk | B29C 70/081 428/408 |
| 6,265,333 | B1 * | 7/2001 | Dzenis | B32B 5/28 156/276 |
| 2004/0250950 | A1 * | 12/2004 | Dubrow | C09J 5/00 156/276 |
| 2005/0175828 | A1 * | 8/2005 | Bradish | B29C 70/086 428/292.1 |
| 2005/0250403 | A1 | 11/2005 | Droux et al. | |
| 2006/0252334 | A1 * | 11/2006 | Lofaro | B32B 5/022 442/400 |
| 2007/0269645 | A1 * | 11/2007 | Raghavendran | B32B 5/28 428/292.1 |
| 2008/0274326 | A1 * | 11/2008 | Kim | B29C 70/24 428/90 |
| 2010/0062671 | A1 * | 3/2010 | Child | A47L 13/16 442/382 |
| 2012/0141728 | A1 * | 6/2012 | Ponsolle | B29B 11/16 428/131 |
| 2012/0164907 | A1 * | 6/2012 | Restuccia | B32B 5/022 442/381 |
| 2013/0052897 | A1 * | 2/2013 | Rogers | B32B 27/12 442/58 |
| 2014/0322504 | A1 * | 10/2014 | Narimatsu | C08J 5/24 428/212 |
| 2015/0174866 | A1 * | 6/2015 | Luinge | B32B 27/08 428/339 |
| 2015/0274934 | A1 | 10/2015 | Meure et al. | |

FOREIGN PATENT DOCUMENTS

| | | | |
|---|---|---|---|
| EP | 0 678 128 | 10/1995 | |
| EP | 1 125 728 | 8/2001 | |
| EP | 1 578 704 A1 | 9/2005 | |
| EP | 1 960 578 A2 | 8/2008 | |
| EP | 2 243 872 | 10/2010 | |
| JP | 49-006783 | 2/1974 | |
| JP | 10-317265 | 12/1998 | |
| JP | 2000-198158 | 7/2000 | |
| JP | 2005-526188 | 9/2005 | |
| JP | 2008-069474 | 3/2008 | |
| WO | WO 2013083268 A1 * | 6/2013 | ............. B32B 27/08 |

OTHER PUBLICATIONS

Kanne et al. "Table Rollings of Composite Tubes" Handbook of Composites, Chapter 19, pp. 425-432, 1998.*
M. Kuwata, H. Zhang, E. Bilotti, T. Peijs, "Interlaminar Toughness Improvement of Carbon Fibre/Expoy Composite Laminates by Electrospun Nanofibre interleaves." ECCM15—15th European Conference on Composite Materials, Venice, Italy, Jun. 24-28, 2012. pp. 1-7.*
Liu, Ling, Hongying Zhang, and Yexin Zhou. "Quasi-static mechanical response and corresponding analytical model of laminates incorporating with nanoweb interlayers." Composite Structures 111 (2014): 436-445. (Year: 2014).*
European Patent Office, Extended European Search Report, EP 15 18 5824 (dated Mar. 2, 2016).
European Patent Office, Communication pursuant to Article 94(3) EPC, 15 185 824.8 (dated Jun. 7, 2017).
The State Intellectual Property Office of China, "First Notification of Office Action," with English translation, App. No. 201510641120.4 (dated Jul. 19, 2018).
Australian Patent Office, Examination Report, App. No. 2015213272 (dated Apr. 24, 2019).
Japan Patent Office, Office Action, App. No. 2015-184657 (dated Feb. 26, 2019).
European Patent Office, "Communication pursuant to Article 94(3) EPC," App. No. 15 185 824.8 (dated Feb. 5, 2019).
European Patent Office, "Communication pursuant to Article 94(3) EPC," App. No. 15 185 824.8 (dated Mar. 21, 2019).
European Patent Office, "Communication pursuant to Article 94(3) EPC," App. No. 15 185 824.8 (dated May 31, 2018).
Japan Patent Office, Office Action, with English translation, App. No. 2015-184657 (dated Aug. 6, 2019).

* cited by examiner

FILAMENT NETWORK FOR A COMPOSITE STRUCTURE

FIELD

The present disclosure is generally related to composite structures and, more particularly, to apparatus and methods for improving stability and functionality of a composite structure using a filament network, such as a filament network including at least one of a plurality of filaments having different lengths, a plurality of filaments having different compositions, or a plurality of filaments having different lengths and compositions.

BACKGROUND

Composite structures are widely used as high-strength, low-weight materials to replace metals, such as in aerospace applications. A composite structure (e.g., a composite laminate) is formed by one or more composite layers (also referred to as plies or lamina). Each composite layer includes a reinforcement material and a matrix material. The reinforcement material may include fibers. The fibers may be oriented in a single direction (e.g., uni-directional) or in two directions (e.g., bi-directional). The matrix material may include a resin.

Bundles of fibers may be laid up in layers to form a reinforcement layup (also referred to as a preform). The resin is infused within spaces defined between the fiber bundles of the preform to form an integrated preform. The preform may be referred to as a wet preform when the fiber bundles have been pre-impregnated with resin or a dry preform when no resin is present. The integrated preform may be partially cured or fully cured to form the composite structure. One example of a composite structure is a carbon fiber-reinforced polymer.

Surfacing veils may be used in composites to impart certain functional characteristics to the composite structure. A veil is a non-woven, thin mat made from short, chopped filaments (e.g., polyester, fiberglass, or nylon filaments) that are held together using a binder (e.g., a thermoplastic binder). For example, veils may be used on an exterior of the composite structure to help absorb resin and provide a resin rich layer that can help protect the composite from ultraviolet light, corrosion, or water absorption and/or may be used between composite layers (e.g., plies) to increase interlayer (e.g., interply) toughness. However, in order to achieve suitable veil stability; filament lengths, the volume of short filaments, and/or the amount of binder is usually increased. These changes can lead to a reduction in functionality, an increase in thickness or an increase in areal weight of the veil and, thus, the composite structure.

Further, additional surface and/or interlayer modifiers (e.g., binders, resin modifiers, particulate additives, and/or surface treatments) may be used in composites to impart certain functional characteristics to the composite structure. However, incorporation of such surface and/or interlayer modifiers may have a negative impact on the resin in the composite structure, mechanical performance of the composite structure, and/or cost of the composite structure.

Accordingly, those skilled in the art continue with research and development efforts in the field of improving the stability and/or the functionality of composite structures.

SUMMARY

In one embodiment, the disclosed filament network may include discontinuous filaments, wherein the discontinuous filaments include at least one of different length filaments and different type filaments.

In another embodiment, the disclosed filament network may include discontinuous filaments, wherein the discontinuous filaments include at least one of different length filaments and different type filaments, wherein the different length filaments include first length filaments and second length filaments, wherein the first length filaments include a first length and the second length filaments include a second length, and wherein the first length is different than the second length.

In another embodiment, the disclosed filament network may include discontinuous filaments, wherein the discontinuous filaments include at least one of different length filaments and different type filaments, wherein the different type filaments include first type filaments and second type filaments, wherein the first type filaments include a first material composition, wherein the second type filaments include a second material composition, and wherein the first material composition is different than the second material composition.

In another embodiment, the disclosed composite structure may include a number of fiber layers, wherein each fiber layer of the number of fiber layers includes a fiber bundle and a filament layer at least partially covering the fiber bundle, the filament layer including discontinuous filaments, the discontinuous filaments including at least one of different length filaments including first length filaments and second length filaments, wherein the first length filaments include a first length and the second length filaments include a second length, and wherein the first length is different than the second length and different type filaments including first type filaments and second type filaments, wherein the first type filaments include a first material composition, wherein the second type filaments include a second material composition, and wherein the first material composition is different than the second material composition, and a resin binding the number of fiber layers together.

In yet another embodiment, the disclosed method for forming a composite structure may include the steps of: (1) positioning a filament layer relative to a fiber bundle to form a fiber layer, wherein the filament layer includes discontinuous filaments, the discontinuous filaments including at least one of different length filaments and/or different type filaments, (2) forming a reinforcement layup for the composite structure from a number of fiber layers, and (3) integrating a resin with the reinforcement layup to form the composite structure including at least one of a low areal weight, a low thickness, and a selected functional characteristic.

Other embodiments of the disclosed apparatus and methods will become apparent from the following detailed description, the accompanying drawings and the appended claims.

DETAILED DESCRIPTION

Figure 1:
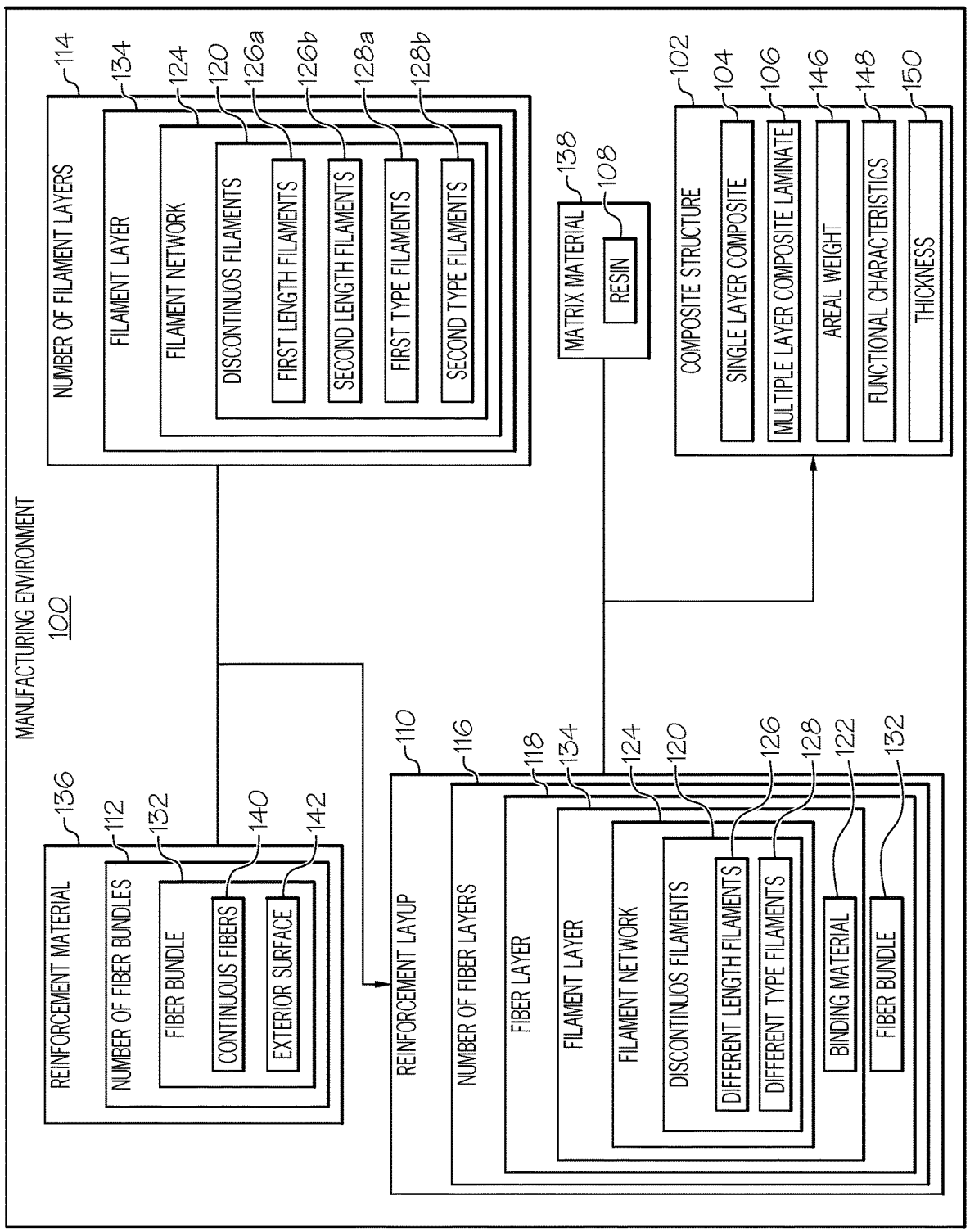
FIG. 1 is a schematic block diagram of one embodiment of the environment for manufacturing the disclosed composite structure.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 illustrates one example embodiment of the disclosed manufacturing environment, generally designated 100, in which a composite structure, generally designated 102, may be manufactured. As one example, the composite structure 102 may take the form of a single layer (e.g., single ply) composite 104. As another example, the composite structure 102 may take the form of a multiple layer (e.g., multiple ply) composite laminate 106.

The composite structure 102 may be formed by integrating a resin 108 (e.g., a matrix material 138) with a reinforcement layup 110. The reinforcement layup 110 may also be referred to as a preform. As used herein, "integrating" the resin 108 with the reinforcement layup 110 means causing the resin 108 to be located within the reinforcement layup 110. For example and without limitation, this integration may be performed by infusing the reinforcement layup 110 with the resin 108, injecting the resin 108 into the reinforcement layup 110, saturating the reinforcement layup 110 with the resin 108, mixing the resin 108 with the reinforcement layup 110, impregnating the reinforcement layup 110 with the resin 108, or some combination thereof.

In one example embodiment, the reinforcement layup 110 may include a number of fiber layers 116 formed from a number of fiber bundles 112 (e.g., a reinforcement material 136) and/or a number of filament layers 114. As used herein, a "number of" items may include one or more items. For example, a number of fiber layers 116 may include one or more fiber layers 118, a number of fiber bundles 112 may include one or more fiber bundles 132, and a number of filament layers 114 may include one or more filament layers 134. As examples, the fiber layer 118 may be one example of one of the number of fiber layers 116, the fiber bundle 132 may be one example of one of the number of fiber bundles 112, and the filament layer 134 may be one example of one of the number of filament layers 114.

The fibers that form the fiber bundle 132 of the number of fiber bundles 112 may be continuous fibers 140. As used herein, a "continuous fiber" may be a long fiber that extends across substantially the entire length or width of the composite structure 102. In one example embodiment, the fiber bundles 132 may include an untwisted grouping of fibers that run substantially parallel to each other. In other example embodiments, the fiber bundles 132 may include a grouping of sized fibers, a twisted grouping of fibers, a braided grouping of fibers, or some other type of grouping of fibers.

In one example embodiment, a plurality of fiber bundles 132 may be arranged such that the fiber bundles 132 run substantially parallel to each other. The fibers in the fiber bundles 132 may include, but are not limited to, carbon fibers, glass fibers, boron fibers, thermoplastic fibers, polymer fibers, other types of fibers, or some combination thereof.

The fiber bundles 132 of the plurality of fiber bundles 112 may include, but are not limited to, at least one of a tow, a ribbon or a piece of tape, depending on the implementation. As an example, a plurality of fiber bundles 112 may include the same or different types of fiber bundles 132, depending on the implementation. As specific, non-limiting examples, the fiber bundle 132 may be implemented as a unidirectional tow, unidirectional tape, woven fabric, noncrimp fabric, and the like.

In one example embodiment, one or more of the fiber bundles 132 may be pre-impregnated with the resin 108. When the fiber bundles 132 are pre-impregnated with the resin 108, reinforcement layup 110 may be referred to as a wet preform. When the fiber bundles 132 are not pre-impregnated with the resin 108, reinforcement layup 110 may be referred to as a dry preform.

In one example embodiment, the density of continuous fibers 140 in the fiber bundle 132 may be sufficiently high such that the porosity of the fiber bundle 132 is below a selected threshold. The selected threshold may be selected such that the permeability of the fiber bundle 132 with respect to the resin 108 is below a selected threshold.

As used herein, the "porosity" of an item is the measure of how much open space is present within the item. For example and without limitation, the open space may be in the form of openings, voids, gaps, or some other type of open space. As used herein, the "permeability" of an item may be the measure of the ease with which a fluid, such as the resin 108 in the disclosed example embodiments, can move through the item. Typically, increased porosity results in increased permeability.

In this example embodiment, the porosity and permeability of each fiber bundle 132 of the number of fiber bundles 112 may be low. As an example, the permeability of the fiber bundle 132 may be sufficiently low such that the resin 108 may permeate or flow through each fiber bundle 132 of the number of fiber bundles 112 slowly when the resin 108 is infused within reinforcement layup 110.

The resin 108 may include at least one polymer. For example and without limitation, the resin 108 may include at least one of a thermosetting polymer, a thermoplastic polymer, and/or some other type of polymer. As specific, non-limiting examples, the resin 108 may include, but are not limited to, thermoplastic material, acrylics, fluorocarbons, polyamides, polyolefins, polyesters, polycarbonates, polyurethanes, polyaryletherketones, polyetherimides, thermosetting material, polyurethanes, phenolics, polyimides, sulphonated polymer (polyphenylene sulphide), a conductive polymer (e.g., polyaniline), benzoxazines, bismaleimides, cyanate esters, polyesters, epoxies, and silsesquioxanes.

As used herein, "at least one of," when used with a list of items, means any combination of one or more of the listed items may be used, but not all of the items of the listed items may be required (e.g., only one of the items of the listed items may be needed). As one non-limiting example, "at least one of item A, item B, and item C" may mean item A; item A and item B; item B; item A, item B, and item C; or item B and item C. As another non-limiting example, "at least one of item A, item B, and item C" may mean two of item A, one of item B, and ten of item C; four of item B and seven of item C; or some other suitable combination.

Infusing the resin 108 within the reinforcement layup 110 may form the composite structure 102. The composite structure 102 may then be left uncured, partially cured, or fully cured, depending on the implementation. The uncured composite structure 102 (e.g., the reinforcement layup 110 with infused resin 108) may be referred to as an integrated preform.

The integrated preform may be partially cured to take the form of a partially cured composite structure. The partial curing may be performed to allow easier transport and/or handling of the partially cured composite structure. The integrated preform may be fully cured to take the form of a fully cured composite structure.

The filament layer 134 may include a filament network 124 formed from a number of discontinuous filaments 120. As one example, the filament network 124 may include a plurality of chopped and entangled discontinuous filaments 120 (e.g., thread-like structures) dispersed into a non-woven format (e.g., a mat). As used herein, "entangled" means that chopped filaments are mechanically entwined with other chopped filaments within the filament network 124. The discontinuous filaments 120 may include a plurality of filaments that do not extend the entire length or width of the composite structure 102. The filaments forming the discontinuous filaments 120 may include individual strands of material (e.g., individual filaments) and/or bundles of strands of material (e.g., bundles of filaments), also referred to as fibers. The discontinuous filaments 120 may include filaments of at least one of different sizes, different lengths, different diameters, different cross-sectional shapes and different types (e.g., material compositions) or some combination thereof. As one general, non-limiting example, discontinuous filaments 120 may include at least one of different length filaments 126, different type filaments 128, or a combination of different length-different type filaments 126, 128.

The filaments making up the discontinuous filaments 120 may include, but are not limited to, at least one of carbon filaments, silica filaments, glass filaments, metal filaments, ceramic filaments, boron filaments, nanotube filaments, polyamide filaments, polyether ether ketone "("PEEK")" filaments, polyether ketone filaments, polyester filaments, polyether sulfone filaments, polyimide filaments, polyurethane filaments, polyolefin filaments, acrylic filaments, nylon filaments, elastomeric filaments, polybenxoxazole filaments, polybenzimidazole filaments, polybenzthiazole filaments, polybenzoxazine filaments, other types of thermoplastic filaments, other types of thermoset filaments, or some other types of filaments.

In one example, the discontinuous filaments 120 may have a random orientation relative to each other. In another example, the discontinuous filaments 120 may not have a random orientation relative to each other.

The filament layer 134 may be implemented as at least one of a veil, a nonwoven mat, a web, a sheet, a tape, or some other type of collection of discontinuous filaments 120. As one specific, non-limiting example, the filament layer 134 may be implemented as a surfacing veil.

In one example embodiment, the density of the discontinuous filaments 120 of the filament layer 134 may be lower than the density of the continuous fibers 140 of the fiber bundle 132. As one example, the density of discontinuous filaments 120 in the filament layers 134 may be sufficiently low such that the porosity of each of the number of filament layers 134 is above a selected threshold. The selected threshold may be selected such that the permeability of filament layer 134 with respect to the resin 108 is above a selected threshold. As an example, the permeability of the filament layers 134 may be sufficiently high to allow the resin 108 to permeate or flow through each filament layer 134 of the number of filament layers 114 when the resin 108 is infused within reinforcement layup 110. As specific, non-limiting examples, the filament density may include, but is not limited to, approximately 1 percent to approximately 15 percent by volume and approximately 15 percent to approximately 75 percent by volume.

The porosity of the filament layer 134 may provide open spaces through which a fluid, such as the resin 108 in the disclosed example embodiments, may flow. Other types of fluids may also be allowed to flow through the open spaces within the filament layers 134. For example, air and gases may be allowed to permeate through the filament layers 134. Further, in some cases, the open spaces may be used to remove at least one of air, undesired gases, or excess moisture from reinforcement layup 110.

Figure 2:
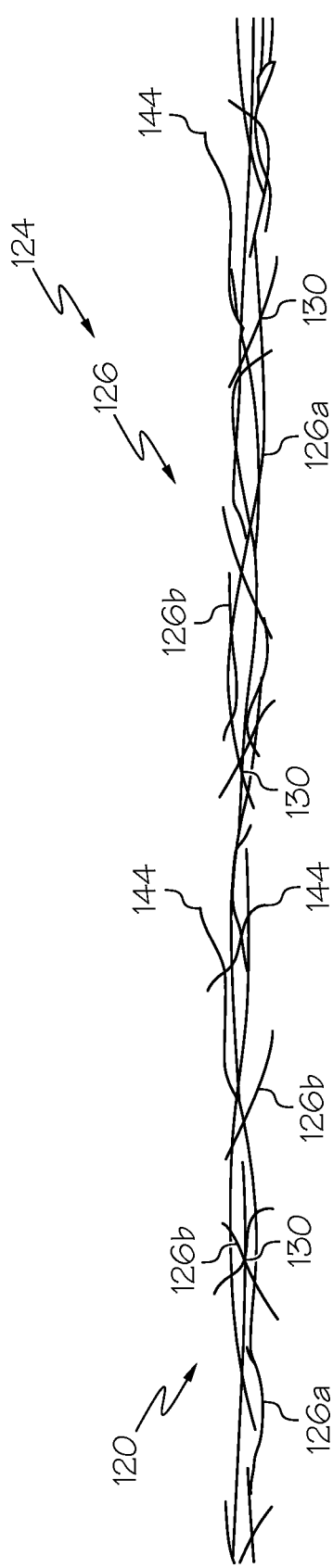
FIG. 2 is schematic illustration of one embodiment of the disclosed filament network used to form a filament layer of the disclosed composite structure.

In certain implementations, the filament network 124 may also include a binding material (also referred to as a binder) 122. The binding material 122 may be configured to bind the filament network 123 together. For example, the binding material 122 may bind the discontinuous filaments 120 to each other. The binding material 122 may be configured to hold the discontinuous filaments 120 together in response to at least one of heat, pressure, and/or a chemical reaction being applied to the binding material 122. For example, the binding material 122 may hold the discontinuous filaments 120 together during handling. As one particular example, the binding material 122 may bind intersecting filaments of the discontinuous filaments 120 at crossover points (e.g., locations) 130 (FIG. 2). The binding material 122 may also be configured to bind the filament layer 134 to the fiber bundles 132 (e.g., bind the fiber layer 118 together). The binding material 122 may also be configured to bind the fiber bundles 132 to each other.

The binding material 122 may include, but is not limited to, at least one of a thermoset material, a thermoplastic material or some other type of binding material. The binding material 122 may be implemented in a form selected from at least one of, soluble polymer film, spray or coating, thermoplastic particles, beads, threads, pieces of tape, or some other form, depending on the implementation.

The filament layer 134 may be positioned relative to the fiber bundle 132 to form at least a portion of the reinforcement layup 110. As one example, at least one filament layer 134 of the number of filament layers 114 may be used to form at least one fiber layer 118 of the number of fiber layers 116 of the reinforcement layup 110. As another example, at least one fiber bundle 132 of the number of fiber bundles 112 may be used to form at least one fiber layer 118 of the number of fiber layers 116 of the reinforcement layup 110. As another example, a plurality of filament layers 134 may be positioned relative to a plurality of fiber bundles 132 to form a plurality of fiber layers 118 of the reinforcement layup 110. As another example, a plurality of filament layers 134 may be positioned relative to a plurality of fiber bundles 132 to form at least one fiber layer 118 of the number of fiber layers 116 of the reinforcement layup 110.

In one example embodiment, the filament layer 134 may be positioned over the fiber bundle 132 such that the filament layer 134 covers at least a portion of an exterior surface 142 of the fiber bundle 132. As one example, the filament layer 134 may be positioned to cover an entirety of a (e.g., major) exterior surface 142 of the fiber bundle 132 such that a fiber layer 118 is formed. As another example, the filament layer 134 may be positioned between and cover an entirety of opposing (e.g., major) exterior surfaces 142 of adjacent fiber bundles 132 such that a fiber layer 118 is formed. This positioning (e.g., layering) process may be repeated for each additional fiber bundle 132 of the number of fiber bundles 112 until the number of fiber bundles 112 and the number of filament layers 114 are positioned to form the number of fiber layer 116 of the reinforcement layup 110.

In one example embodiment, a plurality of fiber bundles 132 may be arranged such that the fiber bundles 132 of each fiber layer 118 run substantially parallel to each other. In another example embodiment, the plurality of fiber bundles 132 may be arranged such that the fiber bundles 132 of each fiber layer 118 run at non-zero angles relative to an adjacent fiber layer 118 (e.g., at 45 degree angles or 90 degree angles). Other arrangements of the fiber bundles 132 are also contemplated.

In another example embodiment, each of the number of fiber layers 116 may be formed in a manner substantially similar to the fiber layer 118 such that each of the number of fiber layers 116 includes the fiber bundle 132 and/or the filament layer 134. The number of fiber layers 116 may be laid up to form the reinforcement layup 110. As one example, the fiber layers 118 of the number of fiber layers 118 may be stacked at least one of one of top of the other or side-by-side to form the reinforcement layup 110. As one specific, non-limiting example, the filament layers 134 may be positioned between adjacent pairs of fiber bundles 132 such that the filament layer 134 forms an interlayer between the adjacent pairs of fiber bundles 132. The interlayer formed by the filament layer 134 may fill any open spaces between the adjacent pairs of fiber bundles 132 and/or between adjacent pairs of fiber layers 118.

Once the reinforcement layup 110 has been formed, the reinforcement layup 110 may be cured such that the resin 108 and/or the binding material 122 bind the filament layers 134 to the fiber bundles 132, the fiber bundles 132 together, and/or the fiber layers 118 together. The resin 108 may be infused within the reinforcement layup 110 such that the resin 108 may fill any open spaces in the fiber bundles 132, open spaces in the filament layers 134, and/or open spaces between the fiber layers 118 to form the composite structure 102.

The example embodiment of the manufacturing environment 100 in FIG. 1 is not meant to imply physical or architectural limitations to the manner in which any example embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an example embodiment.

In one example embodiment, the discontinuous filaments 120 may be configured to improve stability of the filament network 124. As one example, the discontinuous filaments 120 of the filament network 124 may include the different length filaments 126. As one general, non-limiting example, the discontinuous filaments 120 may include first length filaments 126a and second length filaments 126b. The first length filaments 126a may include a first length and the second length filaments 126b may include a second length 126b. The first length may be different than the second length. As one example, the first length filaments 126a (also referred to by example as long filaments 126a) may be greater in length (e.g., longer) that the second length filaments 126b (also referred to by example as short filaments 126b).

As one general, non-limiting example, the filament network 124 may include approximately between 0.5 percent and 99.5 percent by weight of the first length filaments and approximately between 99.5 percent and 0.5 percent by weight of the second length filaments. As one specific, non-limiting example, the longer filaments (e.g., first length filaments) may include approximately between 0.5 percent and 33 percent by weight of the shorter filament (e.g., second length filaments). As another specific, non-limiting example, the longer filaments may include approximately between 0.5 percent and 10 percent by weight of the shorter filament. As yet another specific, non-limiting example, the longer filaments may include approximately between 67 percent and 95 percent by weight of the shorter filament.

As one specific, non-limiting example, the length of the first length filaments 126a may be between 50 percent and 100 percent larger than the length of the second length filaments 126b. As another specific, non-limiting example, the length of the first length filaments 126a may be between 100 percent and 500 percent larger than the length of the second length filaments 126b. As another specific, non-limiting example, the length of the first filaments 126a may be between 500 percent and 1,000 percent larger than the length of the second filaments 126b. As another specific, non-limiting example, the length of the first length filaments 126a may be between 500 percent and 10,000 percent larger than the length of the second filaments 126b.

As one specific, non-limiting example, the first length may be between approximately 1 millimeter and 6 millimeters. As another specific, non-limiting example, the first length may be between 6 millimeters and 15 millimeters. As another specific, non-limiting example, the first length may be between 15 millimeters and 30 millimeters.

As one specific, non-limiting example, the second length may be between approximately 1 millimeter and 6 millimeters. As another specific, non-limiting example, the second length may be between 6 millimeters and 15 millimeters. As another specific, non-limiting example, the second length may be between 15 millimeters and 30 millimeters. As another specific, non-limiting example, the second length may be between 30 millimeters and 100 millimeters. As another specific, non-limiting example, the second length may be between approximately 100 nanometers and 10000 nanometers. As another specific, non-limiting example, the second length may be between 10 micrometers and 500 micrometers.

In another example embodiment, the different length filaments may include third length filaments. The third length filaments may include a third length. The third length may be different than the first length and the second length.

As one general, non-limiting example, the filament network 124 may include approximately between 0.5 percent and 99.5 percent by weight of the first length filaments, approximately between 99.5 percent and 0.5 percent by weight of the second length filaments, and approximately between 0.5 percent and 99.5 percent of the third length filaments. As one specific, non-limiting example, the filament network 124 may include approximately between 30 percent and 40 percent by weight of the first length filaments, approximately between 30 percent and 40 percent by weight of the second length filaments, and approximately between 30 percent and 40 percent of the third length filaments. As another specific, non-limiting example, the filament network 124 may include approximately between 40 percent and 60 percent by weight of the first length filaments, approximately between 35 percent and 55 percent by weight of the second length filaments, and approximately between 25 percent and 5 percent of the third length filaments As one specific, non-limiting example, the third length may be between approximately 100 nanometers and 10000 nanometers. As another specific, non-limiting example, the third length may be between 10 micrometers and 500 micrometers. As another specific, non-limiting example, the third length may be between 1 millimeter and 6 millimeters. As another specific, non-limiting example, the third length may be between 6 millimeters and 15 millimeters. As another specific, non-limiting example, the third length may be between 15 millimeters and 30 millimeters. As another specific, non-limiting example, the third length may be between 30 millimeters and 100 millimeters.

Unless otherwise indicated, the terms "first," "second," "third," etc. are used herein merely as labels, and are not intended to impose ordinal, positional, or hierarchical requirements on the items to which these terms refer. Moreover, reference to lower-numbered item (e.g., a "second" item) does not preclude the existence of higher-numbered item (e.g., a "third" item).

Those skilled in the art will recognize that while only first length filaments 126a and second length filaments 126b are illustrated by example in FIG. 1, a plurality of different length filaments 126 (e.g., first length filaments, second length filaments, third length filaments, fourth length filaments, etc., each having different lengths) may also be included in the discontinuous filaments 120 forming the filament network 124 and/or the filament layer 134, without limitation.

As one example, first length filaments may include a length of approximately between 15 millimeters (mm) and 30 mm (e.g., long filaments). As another example, second length filaments may include a length of approximately between 0.5 mm and 5 mm (e.g., short filaments). As another example, third length filaments may include a length of approximately between 30 mm and 100 mm (e.g., ultra-long filaments). As another example, fourth length filaments may include a length of approximately between 10 micrometers (um) and 500 um (e.g., ultra-short filaments). As another example, fifth length filaments may include a length of approximately between 5 mm and 15 mm (e.g., medium filaments). As yet another example, sixth length filaments may include a length of approximately between 100 nm and 10000 nm (e.g., nano filaments).

In the disclosed example embodiments, a combination of both at least first length filaments 126a and second length filaments 126b (and/or third, fourth, fifth, etc. length filaments) may make up the discontinuous filaments 120 forming the filament network 124 to improve the stability of the filament network 124 (e.g., the stability of the veil). As used herein, "stability" of the filament network 124 means that the filament network 124 can be manufactured as a continuous, homogenous sheet of discontinuous filaments 120 and/or support a filament layer 134 or fiber layer 118

The present disclosure recognizes and takes into account that if the filament network does not have a sufficient number of crossover points between intersecting discontinuous filaments to hold the filament network together, the filament network may fall apart or tear during part layup (e.g., formation of the reinforcement layup) or manufacturing or may be otherwise unusable in forming the composite structure.

The present disclosure also recognizes and takes into account that in order to achieve a stable filament network using only short filaments, the amount of short filaments required must be increased in order to increase the number of crossover points of the discontinuous fibers (e.g., increase the entanglement of the short filaments) forming the filament network and this increase in short filaments necessarily increases the areal weight and/or thickness of the filament network leading to a high areal weight of the filament network, the filament layer, and/or the composite formed using the filament layer. As used herein, "high areal weight" means an areal weight of greater than 10 grams per square meter (gsm). The use of high areal weight filament networks (e.g., veils) may result in a reduced fiber bundle volume fraction or per ply thickness, which consequently reduces the modulus of the part (e.g., the composite structure) and increases the thickness and/or the weight of the part.

The present disclosure also recognizes and takes into account that a stable filament network (e.g., veil) formed from only long filaments may form a filament layer that has less filament ends to interpenetrate a neighboring fiber bundle and/or filament layer, which may lead to reduced damage tolerance of the composite structure when compared to a filament layer made only from short filaments due to the increased tortuous crack propagation, particularly within interlayer regions of composites containing short filaments.

Thus, the use of both first length filaments 126a (e.g., long filaments) and second length filaments 126b (e.g., short filaments) may allow a smaller percentage of second length filaments 126b to be used in forming a stable filament network 124. The use of long filaments may increase the stability of the filament network 124 by providing a sufficient number of crossover points 130 (FIG. 2) for the short filaments (e.g., sufficient entanglement of the discontinuous filaments 120).

The smaller percentage of short filaments may decrease the areal weight and/or thickness of the filament network 124 to achieve a low areal weight and a thin filament layer 134. As used herein, "low areal weight" means an areal weight of approximately between 1 gsm and 10 gsm and, more preferably, approximately between 1 gsm and 4 gsm. As used herein, "thin" filament layer 134 means a filament layer 134 having a thickness of approximately between 0.1 microns and 50 microns. Thus, the filament layer 134 formed from first length filaments 126a (e.g., long filaments) and second length filaments 126b (e.g., short filaments) may have a thickness of at least 10 percent less than the thickness of a filament layer formed from only short filaments.

The use of short filaments may provide an increased number of filament ends 144, which increase penetration (e.g., interpenetration) of the filament layer 134 (e.g., the discontinuous filaments 120) into neighboring (e.g., directly adjacent) filament layers 134 and/or fiber bundles 132. This increased penetration may reduce crack propagation along fiber bundle-to-fiber bundle interfaces, filament layer-to-fiber bundle interfaces, and/or filament layer-to-filament layer interfaces.

As one example implementation, the discontinuous filaments 120 forming filament network 124 may include between approximately 1 percent and 10 percent second length filaments 126b and between approximately 90 percent and 99 percent first length filaments 126a. As another example implementation, the discontinuous filaments 120 forming the filament network 124 may include between approximately 1 percent and 10 percent first length filaments 126b and between approximately 90 percent and 99 percent second length filaments 126b. As another example implementation, the discontinuous filaments 120 forming the filament network 124 may include between approximately 1 percent and 30 percent first length filaments 126a and between approximately 60 percent and 99 percent second length filaments 126b. As another example implementation, the discontinuous filaments 120 forming the filament network 124 may include between approximately 1 percent and 30 percent second length filaments 126b and between approximately 60 percent and 99 percent first length filaments 126a. As another example implementation, the discontinuous filaments 120 forming the filament network 124 may include approximately 50 percent first length filaments 126a and approximately 50 percent second length filaments 126b.

In one example embodiment, the discontinuous filaments 120 may be configured to provide various desired functionalities to the filament network 124 or impart desired characteristics to the filament layer 134 and/or the composite structure 102. As one example, the discontinuous filaments 120 of the filament network 124 may include the different type filaments 128.

In one example embodiment, the different type filaments 128 of the discontinuous filaments 120 may include first type filaments 128a and second type filaments 128b. As used herein, "type" filament means the composition and/or characteristics of the material or materials used to form the filaments (referred to collectively herein as material composition).

As one general, non-limiting example, the different type filaments may include first type filaments and second type filaments. The first type filaments may include a first material composition. The second type filaments may include a second material composition. The first material composition may be different than the second material composition.

As one specific, non-limiting example, the different type filaments may include at least two of toughening filaments, stiff filaments, low melting point filaments, high flame resistant filaments, filaments having a high surface area, and conductive filaments.

As one general, non-limiting example, the filament network 124 may include approximately between 0.5 percent and 99.5 percent by weight of the first type filaments and approximately between 99.5 percent and 0.5 percent by weight of the second type filaments. As one specific, non-limiting example, the first type filaments may include approximately between 0.5 percent and 33 percent by weight of the second type filament. As another specific, non-limiting example, the first type filaments may include approximately between 0.5 percent and 10 percent by weight of the second filament.

In another example embodiment, the discontinuous filaments 120 may include third type filaments. The third type filaments may include a third material composition. The third material composition may be different than the first material composition and the second material composition.

As one general, non-limiting example, the filament network 124 may include approximately between 0.5 percent and 99.5 percent by weight of the first type filaments, approximately between 99.5 percent and 0.5 percent by weight of the second type filaments, and approximately between 0.5 percent and 99.5 percent of the third type filaments. As one specific, non-limiting example, the filament network 124 may include approximately between 30 percent and 40 percent by weight of the first type filaments, approximately between 30 percent and 40 percent by weight of the second type filaments, and approximately between 30 percent and 40 percent of the third type filaments. As another specific, non-limiting example, the filament network 124 may include approximately between 40 percent and 60 percent by weight of the first type filaments, approximately between 35 percent and 55 percent by weight of the second type filaments, and approximately between 25 percent and 5 percent of the third type filaments.

Those skilled in the art will recognize that while only first type filaments 128a and second type filaments 128b are illustrated by example in FIG. 1, a plurality of different type filaments 128 (e.g., first type filaments, type length filaments, third type filaments, fourth type filaments, etc., each of different types) may also be included in the discontinuous filaments 120 forming the filament network 124 and/or the filament layer 134, without limitation.

As one specific, non-limiting example, toughening filaments may be used in the filament network 124. As another specific, non-limiting example, toughening filaments may be used to increase toughness of the composite structure 102 through crack deflection, resin ligament shearing, roughness induced closure, crack pinning, filament yield shearing, zone softening, crack bridging, and/or stress zone crazing. As another specific, non-limiting example, toughening filaments may be used to improve damage tolerance of the composite structure 102. As another specific, non-limiting example, toughening filaments may be used to improve interply toughness of the composite structure 102.

As used herein, "improved interply toughness" means at least a 10 percent increase in resistance to cracks between the filament layer 134 and the fiber bundle 132, between fiber bundles 132, and/or between fiber layers 118 of the composite structure 102 compared to a traditionally manufactured composite structure. As examples, toughening filaments may include, but are not limited to, carbon filaments, polyether ether ketone filaments, polyimide filaments, polyolefin filaments, elastomeric filaments, nylon filaments, polyurethane filaments, or any other thermoplastic, thermoset or inorganic filaments that cause an increase in the overall fracture toughness of the resin 108.

As another specific, non-limiting example, filaments having a low melting point may be used to stabilize the filament network 124 and/or increase thermal bonding of the discontinuous filaments 120. As used herein, "low melting point" means a melting point between approximately 50° C. and 175° C. The present disclosure recognizes and takes into account that incorporation of the binding material into the reinforcement layup may have a negative impact upon the resin in composite structure. For example, the binding material may result in a drop in glass transition temperature of the resin and the composite structure. The use of low melting point filaments may eliminate this disadvantage by potentially limiting or eliminating the need for the binding material 122. Examples of low melting point filaments may include, but are not limited to, polyolefins, polyurethanes, polyamides, core-sheath copolymides, and thermoplastics.

As another specific, non-limiting example, filaments having high flame retardant and/or high flame resistant filaments may be used to reduce flammability or increase flame resistance of the composite structure 102 and/or reduce or eliminate the need for surface protection of the composite structure 102. As example, high flame resistant filaments may include, but are not limited to, polyimide filaments, polybenzoxazole filaments, polybenzimidazole filaments, polybenzthiazole filaments, polybenzoxazine filaments, ceramic filaments, glass filaments, phenolic filaments or any other types of filaments that achieve a reduction in flammability of the filament network 124, the filament layer 134 and/or the composite structure 102. As used herein, "reduction in flammability" means at least one of a 10 percent reduction in smoke generated, at least a 10 percent reduction in vertical burn length, and/or at least a 10 percent reduction in area of charring, delamination and/or combustion of the resin 108 from an external flame source compared to a traditionally manufactured composite structure.

As another specific, non-limiting example, stiff filaments may be used to increase the mechanical stabilization of the composite structure 102. An increase in mechanical stabilization may increase the mechanical strength (e.g., tensile strength, shear strength, etc.) of the filament network 124 and/or the filament layer 134. Examples of stiff filaments may include, but are not limited to, carbon, glass, metallic, and ceramic filaments.

Stiff filaments may be used to control the thickness of the filament network 124 and/or the filament layer 134. As one example, the stiffer the filaments, the less compression is possible of the filament network 124 such that thickness of the filament network 124 during handling and/or the filament layer 134 after composite curing (which may be intrinsically different from each other) vary with stiff filament content. As one specific, non-limiting example, as carbon content decreases through 100 percent, 67 percent, 33 percent and 10 percent; the handling thickness can decrease from 0.47 mm, 0.25 mm, 0.15 mm, and 0.05 mm, respectively. At a given areal weight, the thickness of the filament layer 134 (or filament network 124) may be proportional to the volume fraction ("vf") of the filament layer 134 in the composite interlayer such that controlling the stiff filament content may enable control of the filament vf in the composite interlayer. The filament vf in the interlayer may effect toughening, flammability, electromagnetic environmental performance, and/or general composite mechanical performance.

As another specific, non-limiting example, filaments having a high surface area may be used to improve toughness of the filament network 124, the filament layer 134 and/or the composite structure 102. As examples, the "high surface area" filaments may include filaments having surface functionalized filaments, nano filaments, activated carbon filaments, and/or, porous fibers.

As another specific, non-limiting example, conductive filaments may be used to increase conductivity (e.g., improve electromagnetic environmental performance) of the composite structure 102. As one example, conductive filaments may include any type of filament having at least a 10 percent lower electrical resistance than the resin 108. Examples of conductive filaments may include, but are not limited to, metal filaments and carbon filaments.

Figure 4:
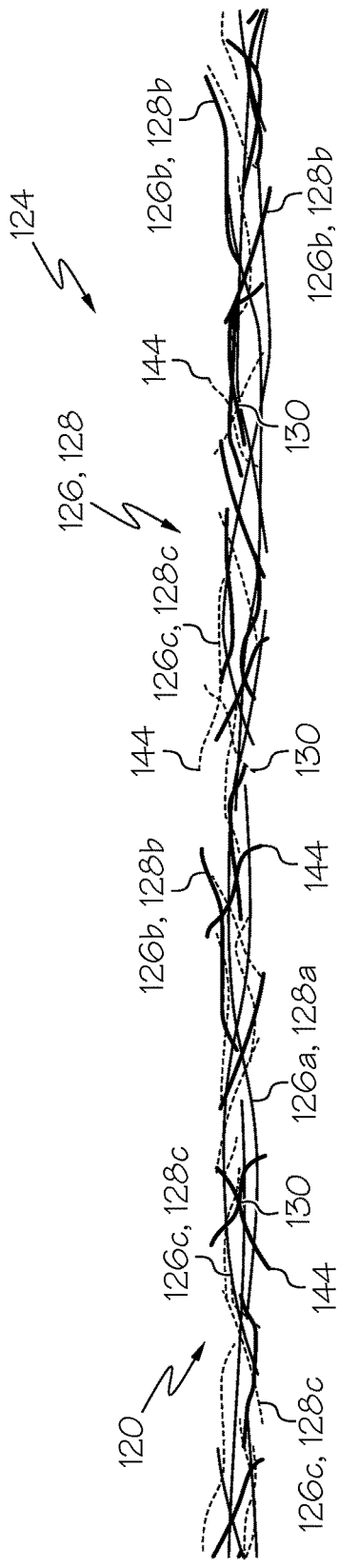
FIG. 4 is a schematic illustration of another embodiment of the disclosed filament network.

As one example implementation, the discontinuous filaments 120 forming filament network 124 may include between approximately 1 percent and 10 percent first type filaments 128a and between approximately 90 percent and 99 percent second type filaments 128b. As another example implementation, the discontinuous filaments 120 forming the filament network 124 may include between approximately 1 percent and 10 percent second type filaments 128b and between approximately 90 percent and 99 percent first type filaments 128a. As another example implementation, the discontinuous filaments 120 forming the filament network 124 may include between approximately 1 percent and 30 percent first type filaments 128a and between approximately 60 percent and 99 percent second type filaments 128b. As another example implementation, the discontinuous filaments 120 forming the filament network 124 may include between approximately 1 percent and 30 percent second type filaments 128b and between approximately 60 percent and 99 percent first type filaments 128a. As another example implementation, the discontinuous filaments 120 forming the filament network 124 may include approximately 50 percent first type filaments 128a and approximately 50 percent second type filaments 128b. As another example implementation, the discontinuous filaments 120 forming the filament network 124 may include between approximately 1 percent and 85 percent first type filaments 128a, between approximately 1 percent and 5 percent second type filaments 128b, and between approximately 1 percent and 15 percent third type filaments 128c (FIG. 4). As another example implementation, the discontinuous filaments 120 forming the filament network 124 may include approximately 33 percent first type filaments 128a, approximately 33 percent second type filaments 128b, and approximately 33 percent third type filaments 128c. Other percent by weight implementations of the different type filaments 128 of the discontinuous filaments 120 forming the filament network 124 are also contemplated, without limitation. Other percent by weight implementations of the different length filaments 126 of the discontinuous filaments 120 forming the filament network 124 are also contemplated, without limitation.

In one example embodiment, the discontinuous filaments 120 of the filament network 124 may include a combination of both different length filaments 126 and different type filaments 128. As one example, the discontinuous filaments 120 may include multiple different type filaments 128 (e.g., a first type filament, a second type filament, and a third type filament) and each may be chopped to (e.g., within) a specific length range (e.g., a first length filament, a second length filament, and a third length filament). In one example implementation, each of the different type filaments 128 may be a different length filament 126 (e.g., each may have a different length). For example, the first type filament may be a first length filament having a first length (e.g., a long filament), the second type filament may be a second length filament having a second length (e.g., a short filament), and the third type filament may be a third length filament having a third length (e.g., an ultra-short filament). The first length, the second length, and the third length may all be different.

In another example implementation, at least one of the different type filaments 128 may be a different length filament 126 (e.g., at least one may have a different length). For example, the first type filament may be a first length filament (e.g., a long filament), the second type filament may be a second length filament (e.g., a short filament), and the third type filament may be a second length filament (e.g., a short filament).

As one general, non-limiting example realization of the disclosed embodiments, the discontinuous filaments 120 forming the filament network 124 may include at least two of first type filaments (e.g., toughening filaments) being first length filaments (e.g., long filaments) to improve stability of the filament network 124 and improve interply toughness of the composite structure 102, second type filaments (e.g., toughening filaments) being second length filaments (e.g., short filaments) to improve toughness and/or damage tolerance of the composite structure 102, third type filaments (e.g., stiff filaments) being third length filaments (e.g., long filaments) to increase interface entanglement and/or improve mechanical stabilization of the filament layer 134 and/or the composite structure 102, fourth type filaments (e.g., low melting point filaments) being fourth length filaments (e.g., short filaments) to reduce the amount of binding material 122 required to achieve a stabilized filament network 124 and/or reduce glass transition temperatures, fifth type filaments (e.g., high flame resistant filaments) being fifth length filaments (e.g., short filaments) to reduce flammability of the filament network, 124, the filament layer 134 and/or the composite structure 102, sixth type filaments (e.g., conductive filaments) being sixth length filaments (e.g., short filaments) to promote z-direction conductivity, and/or seventh type filaments (e.g., conductive filaments) being seventh length filaments (e.g., long filaments) to enable percolation threshold in the x-y plane. The resulting composite structure 102 may include a stable filament network 124, a low areal weight 146, a thin filament layer 134, a low thickness 150 and various increased composite functional characteristics 148 (e.g., characteristics and/or functionalities).

One example of a benefit of incorporating both different type filaments 128 and different length filaments 126 in the filament network 124 (or the filament layer 134) may include incorporating short, low melting point filaments with longer filaments of a different type in the discontinuous filaments 120 forming the filament network 124. Those skilled in the art will recognize that incorporation of long, low melting point copolyamide filaments may result in deformation of the filament layer (e.g., the veil) through shrinkage of the long, low melting point filaments (e.g., through the release of frozen strain), which may draw in large areas of the filament layer resulting in out-of-plane distortion. The use of short, low melting point core sheath copolyamide filaments may stabilize a different type and/or length of filament, which may not draw in as many of the surrounding filaments and/or may reduce out-of-plane distortion.

In one specific, non-limiting example realization of the disclosed embodiments, the discontinuous filaments 120 forming the filament network 124 may include carbon filaments (e.g., first type filaments) chopped to a length range approximately between 18 mm and 24 mm (e.g., first length filaments), polyimide filaments (e.g., second type filaments) chopped to a length range approximately between 10 mm and 15 mm (e.g., second length filaments) and to a length range approximately between 1 mm and 4 mm (e.g., third length filaments), and nylon filaments (e.g., third type filaments) chopped to a length range approximately between 6 mm and 12 mm (e.g., fourth length filaments).

Referring to FIG. 2, one example configuration of the disclosed filament network 124 may include discontinuous filaments 120 having different length filaments 126. The filament network 124 illustrated in FIG. 2 may be one example of one implementation of the filament layer 134 of the number of filament layers 114 (FIG. 1). The different length filaments 126 may include a non-woven combination of first length filaments 126a (e.g., long filaments) and second length filaments 126b (e.g., short filaments). As one example realization of the disclosed configuration, the long filaments may support the dispersed short filaments resulting in a connected network of discontinuous filaments 120 having a sufficient number of crossover points 130 to achieve a stable filament network 124. The resulting filament layer 134 having different length filaments 126 may have a low areal weight and sufficient filament ends 144 to achieve sufficient interpenetration with a neighboring filament layer 134 and/or fiber bundle 132 of the reinforcement layup 110 (FIG. 1).

Figure 3:
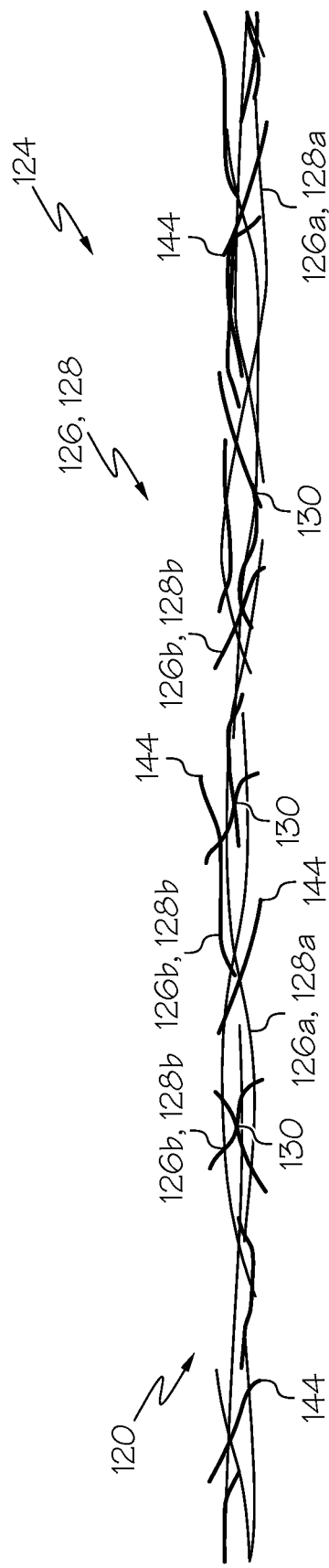
FIG. 3 is a schematic illustration of another embodiment of the disclosed filament network.

Referring to FIG. 3, another example configuration of the disclosed filament network 124 may include discontinuous filaments 120 having different length filaments 126 and different type filaments 128. The filament network 124 illustrated in FIG. 3 may be one example of one implementation of the filament layer 134 of the number of filament layers 114 (FIG. 1). The discontinuous filaments 120 may include a non-woven combination of first length-first type filaments 126a, 128a (e.g., long, stiff filaments) and second length-second type filaments 126b, 128b (e.g., short, toughening filaments). As one example realization of the disclosed configuration, the long tough filaments may support the dispersed short stiff filaments resulting in a connected network of discontinuous filaments 120 having a sufficient number of crossover points 130 to achieve a stable filament network 124. The resulting filament layer 134 having different length filaments 126 may have a low areal weight and sufficient filament ends 144 to achieve sufficient interpenetration with a neighboring filament layer 134 and/or fiber bundle 132 of the reinforcement layup 110 (FIG. 1). The resulting filament network 134 having different type filaments 128 may have increased functional characteristics (e.g., improved toughness and mechanical stability). The resulting filament layer 134 having different length-different type filaments 126,128 may have a low areal weight, sufficient filament ends 144 to achieve sufficient interpenetration with a neighboring filament layer 134 and/or fiber bundle 132 of the reinforcement layup 110, and increased functional characteristics.

Referring to FIG. 4, another example configuration of the disclosed filament network 124 may include discontinuous filaments 120 having different length filaments 126 and different type filaments 128. The filament network 124 illustrated in FIG. 4 may be one example of one implementation of the filament layer 134 of the number of filament layers 114 (FIG. 1). The discontinuous filaments 120 may include a non-woven combination of first length-first type filaments 126a, 128a (e.g., long, toughening filaments), second length-second type filaments 126b, 128b (e.g., short, toughening filaments), and third length-third type filaments 126c, 128c (e.g., short, low melting point filaments). As one example realization of the disclosed configuration, the long tough filaments may support the dispersed short stiff filaments and the short low melting point filaments resulting in a connected network of discontinuous filaments 120 having a sufficient number of crossover points 130 to achieve a stable filament network 124. The resulting filament layer 134 having different length filaments 126 may have a low areal weight and sufficient filament ends 144 to achieve sufficient interpenetration with a neighboring filament layer 134 and/or fiber bundle 132 of the reinforcement layup 110 (FIG. 1). The resulting filament layer 134 having different type filaments 128 may have increased functional characteristics (e.g., improved toughness and the elimination of the binding material 122). The resulting filament layer 134 having different length-different type filaments 126,128 may have a low areal weight, sufficient filament ends 144 to achieve sufficient interpenetration with a neighboring filament layer 134 and/or fiber bundle 132 of the reinforcement layup 110, and increased functional characteristics.

Figure 5:
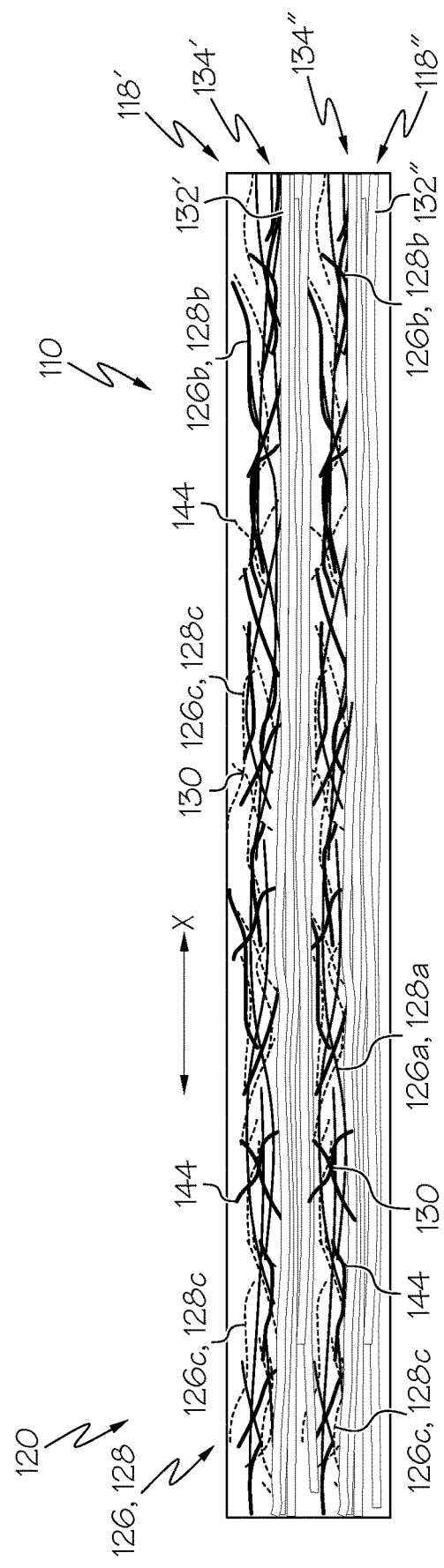
FIG. 5 is a schematic illustration of one embodiment of the reinforcement layup used to form the disclosed composite structure.

Those skilled in the art will recognize that while only first length-first type filaments 126a, 128a, second length-second type filaments 126b, 128b, and third length-third type filaments 126c, 128c are illustrated by example in FIGS. 3-5, a plurality of different length-type combination of discontinuous filaments 120 (e.g., first length-first type filaments, second length-second type filaments, second length-first type filaments, third length-third type filaments, second length-fourth type filaments, etc., having various combinations of different lengths and/or types) may also be included in the discontinuous filaments 120 forming the filament network 124 and/or the filament layer 134, without limitation.

Referring to FIG. 5, one example configuration of the disclosed reinforcement layup 110 may include at least fiber layer 118 (identified individually as a first fiber layer 118' and a second fiber layer 118"). The fiber layer 118 illustrated in FIG. 5 may be one example of one implementation of the number of fiber layers 116 (FIG. 1). For example, the number of fiber layers 116 may include the first fiber layer 118' and the second fiber layer 118". The fiber layer 118 may include at least one filament layer 134 (identified individually as a first filament layer 134' and a second filament layer 134") and at least one fiber bundle 132 (identified individually as a first fiber bundle 132' and a second fiber bundle 132").

The filament layer 134 may be one example of one implementation of the number of filament layers 114 (FIG. 1). The filament layer 134 may include discontinuous filaments 120 having different length filaments 126 and different type filaments 128. The discontinuous filaments 120 may include a non-woven combination of first length-first type filaments 126a, 128a (e.g., long tough filaments), second length-second type filaments 126b, 128b (e.g., short tough filaments), and third length-third type filaments 126c, 128c (e.g., short low melting point filaments). As one example realization of the disclosed configuration, the filament network 124 may be configured as illustrated in FIG. 4.

The fiber bundles 132 may be one example of one implementation of the number of fiber bundles 112 (FIG. 1). The first fiber layer 118' may include first fiber bundles 132' that run parallel to each other. Similarly, the second fiber layer 118" may include second fiber bundles 132" that run parallel to each other. As one example, and as depicted in FIG. 5, the fiber bundles 132 of each fiber layer 118 may run substantially parallel to each other. In one example implementation, the first fiber bundles 132' of the first fiber layer 118' may run substantially parallel to an x-axis of the reinforcement layup 110 and the second fiber bundles 132" of the second fiber layer 118" may run substantially parallel to the x-axis of the reinforcement layup 110 (e.g., substantially parallel to the first fiber bundles 132').

As another example (not shown), the fiber bundles 132 of each fiber layer 118 may not run substantially parallel to each other. In one example implementation, the first fiber bundles 132' of the first fiber layer 118' may run substantially parallel to the x-axis of the reinforcement layup 110 and the second fiber bundles 132" of the second fiber layer 118" may run at a non-zero angle relative to the x-axis (e.g., at a non-zero angle relative to the first fiber bundles 132'). As one example, the second fiber bundles 132" of the second fiber layer 118" may run at a 45-degree angle relative to the x-axis. As another example, the second fiber bundles 132" of the second fiber layer 118" may run at a 90-degree angle relative to the x-axis (e.g., parallel to a y-axis of the reinforcement layup 110).

Those skilled in the art will recognize that the example configurations depicted in FIGS. 2-5 are illustrative examples of a plurality of different configurations of the filament network 124. Additional and/or different combination of different length filaments 126 (e.g., ultra-long filaments, long filaments, medium filaments, short filaments, ultra-short filaments, or other length filaments) may be used without limitation. Additional and/or different combinations of different type filaments 128 (e.g., tough filaments, low melting point filaments, high flame resistant filaments, stiff filaments, high surface area filaments, conductive filaments, etc.) may be used without limitation.

Those skilled in the art will further recognize that the percent of each different length filament 126 (e.g., ratio of long filaments to short filaments) may vary and different percentages are contemplated to achieve stability of the filament network 124. Similarly, the percent of each different type filament 126 (e.g., ratio of tough filaments to stiff filaments, high flame resistant filaments, low melting point filaments, etc.) may vary and different percentages are contemplated to achieve the desired functional characteristics of the filament layer 134 and/or the composite structure 102.

The binding material 122 may be used in each of the example configurations.

As one specific, non-limiting example realization of the disclosed example embodiments, the discontinuous filaments 120 forming the filament layer 134 may include approximately 50 percent to 97 percent (e.g., percent by weight) polyimide filaments and approximately 50 percent to 3 percent copolyamide filaments.

As another specific, non-limiting example realization of the disclosed example embodiments, the discontinuous filaments 120 forming the filament layer 134 may include approximately 50 percent to 97 percent carbon filaments and approximately 50 percent to 3 percent copolyamide filaments.

As another specific, non-limiting example realization of the disclosed example embodiments, the discontinuous filaments 120 forming the filament layer 134 may include approximately 50 percent to 97 percent polyether ether ketone filaments and approximately 50 percent to 3 percent copolyamide filaments.

As another specific, non-limiting example realization of the disclosed example embodiments, the discontinuous filaments 120 forming the filament layer 134 may include approximately 50 percent to 97 percent polyimide filaments and approximately 50 percent to 3 percent carbon filaments.

As another specific, non-limiting example realization of the disclosed example embodiments, the discontinuous filaments 120 forming the filament layer 134 may include approximately 50 percent to 97 percent polyether ether ketone filaments and approximately 50 percent to 3 percent carbon filaments.

As another specific, non-limiting example realization of the disclosed example embodiments, the discontinuous filaments 120 forming the filament layer 134 may include approximately 90 percent to 5 percent polyimide filaments, approximately 90 percent to 5 percent carbon filaments, and approximately 90 percent to 5 percent copolyamide filaments.

As another specific, non-limiting example realization of the disclosed example embodiments, the discontinuous filaments 120 forming the filament layer 134 may include approximately 90 percent to 5 percent polyether ether ketone filaments, approximately 90 percent to 5 percent carbon filaments, and approximately 90 percent to 5 percent copolyamide filaments.

As another specific, non-limiting example realization of the disclosed example embodiments, the discontinuous filaments 120 forming the filament layer 134 may include approximately 40 percent to 0.5 percent filaments having a length of approximately 18 mm to 30 mm, approximately 40 percent to 5 percent filaments having a length of approximately 6 mm to 18 mm, and approximately 94.5 percent to 20 percent filaments having a length of approximately 0.5 mm to 6 mm.

As another specific, non-limiting example realization of the disclosed example embodiments, the discontinuous filaments 120 forming the filament layer 134 may include approximately 50 percent to 95 percent filaments having a length of approximately 0.5 mm to 18 mm and approximately 50 percent to 5 percent filaments having a length of approximately 18 mm to 30 mm.

As yet another specific, non-limiting example realization of the disclosed example embodiments, the discontinuous filaments 120 forming the filament layer 134 may include approximately 50 percent to 85 percent filaments having a length of approximately 6 mm to 18 mm, approximately 1 percent to 49 percent filaments having a length of approximately 0.5 mm to 6 mm, and approximately 1 percent to 49 percent filaments having a length of approximately 18 mm to 30 mm.

In any of the example realizations of the filament network 124 and/or filament layer 134 (e.g., a composite veil) formed from discontinuous filaments 120 including different length filaments 126 (e.g., long filaments and short filaments), the filament network 124, the filament layer 134, and/or the composite structure 102 may have a low areal weight (e.g., an areal weight of between approximately 1 gsm and 10 gsm).

In any of the example realizations of the filament network 124 and/or filament layer 134 (e.g., a composite veil) formed from discontinuous filaments 120 including different type filaments 128, the filament network 124, the filament layer 134, and/or the composite structure 102 may have various different functional characteristics at high areal weights (e.g., areal weights between approximately 10 gsm and 30 gsm).

In any of the example realizations of the filament network 124 and/or filament layer 134 (e.g., a composite veil) formed from discontinuous filaments 120 including both different length filaments 126 and different type filaments 128, the filament network 124, the filament layer 134, and/or the composite structure 102 may have various different functional characteristics at low areal weights.

Figure 6:
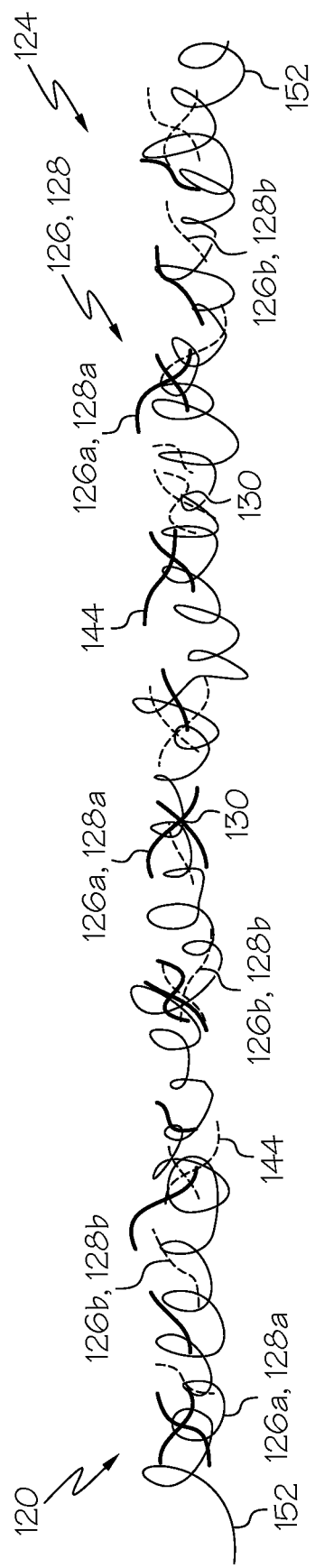
FIG. 6 is a schematic illustration of another embodiment of the disclosed filament network.

Referring to FIG. 6, in another example embodiment, the filament network 124 and/or the filament layer 134 may include a number of continuous filaments 152 (e.g., one or more continuous filaments 152) formed in a non-woven format (e.g., formed as a non-woven sheet or web) and the number of discontinuous filaments 120. The continuous filaments 152 may form a base to support the discontinuous filaments 120. As one example, the filament network 124 (and/or the filament layer 134) may include the plurality of chopped and entangled (e.g., mechanically entwined) discontinuous filaments 120 dispersed into a non-woven continuous filament 152. The continuous filaments 152 may include one or more continuous filaments that extend the entire length or width of the composite structure 102. The discontinuous filaments 120 may include a plurality of chopped discontinuous filaments that do not extend the entire length or width of the composite structure 102. The filaments forming the continuous filaments 152 may include individual strands of material (e.g., individual filaments) and/or bundles of strands of material (e.g., bundles of filaments), also referred to as fibers. The discontinuous filaments 120 added to the continuous filaments 152 may include filaments of at least one of different sizes, different lengths, different diameters, different cross-sectional shapes and different types (e.g., material compositions) or some combination thereof. As one general, non-limiting example, discontinuous filaments 120 added to the continuous filaments 152 may include at least one of different length filaments 126, different type filaments 128, or a combination of different length-different type filaments 126, 128.

One example configuration of the disclosed filament network 124 may include continuous filaments 152 and discontinuous filaments 120 having first length-first type filaments 126*a*, 128*a* (e.g., short, toughening filaments) and second length-second type filaments 126*b*, 128*b* (e.g., short, low melting point filaments). The filament network 124 illustrated in FIG. 6 may be one example of one implementation of the filament layer 134 of the number of filaments layers 114 (FIG. 1). As one example realization of the disclosed configuration of the filament network 124, the continuous filaments 152 may support the dispersed discontinuous filaments 120 (e.g., the short, toughening filaments and the short, low melting point filaments) resulting in a stable connected network of continuous filaments 152 and discontinuous filaments 120 (e.g., having a sufficient number of crossover points 130). The resulting filament layer 134 having different length filaments 126 may have a very low areal weight and sufficient filament ends 144 to achieve sufficient interpenetration with a neighboring filament layer 134 and/or fiber bundle 132 of the reinforcement layup 110 (FIG. 1). The resulting filament layer 134 having different type filaments 128 may have increased functional characteristics (e.g., improved toughness and the elimination of the binding material 122). The resulting filament layer 134 having different length-different type filaments 126,128 may have a very low areal weight, sufficient filament ends 144 to achieve sufficient interpenetration with a neighboring filament layer 134 and/or fiber bundle 132 of the reinforcement layup 110, and increased functional characteristics.

Those skilled in the art will recognize that while only first length-first type filaments 126*a*, 128*a* and second length-second type filaments 126*b*, 128*b* are illustrated by example in FIG. 6, a plurality of different length-type combination of discontinuous filaments 120 (e.g., first length-first type filaments, second length-second type filaments, second length-first type filaments, third length-third type filaments, second length-fourth type filaments, etc., having various combinations of different lengths and/or types) may also be included in the discontinuous filaments 120 added to the continuous filaments 152 forming the filament network 124 and/or the filament layer 134, without limitation.

Figure 7:
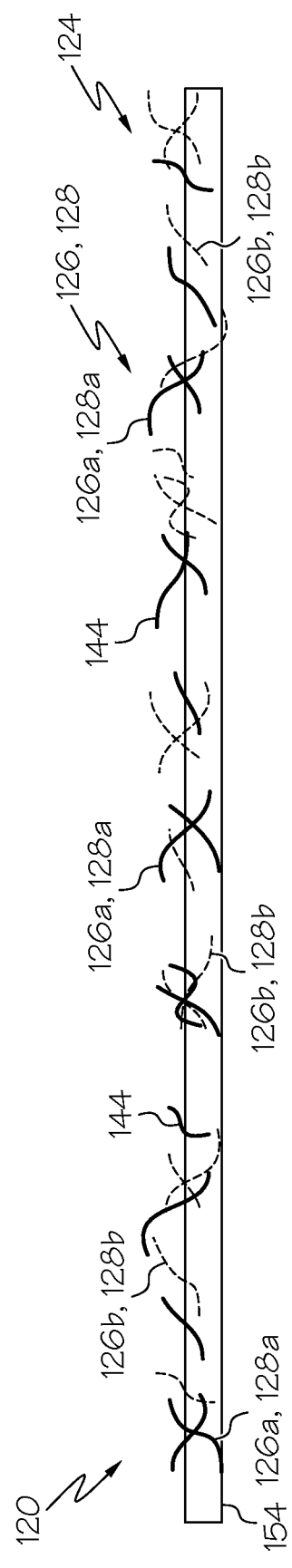
FIG. 7 is a schematic illustration of another embodiment of the disclosed filament network.

Referring to FIG. 7, in another example embodiment, the filament network 124 and/or the filament layer 134 may include a film 154 and the number of discontinuous filaments 120. The film 154 may be a thin, continuous substrate (e.g., sheet) of polymeric material that may form the base to which the discontinuous filaments 120 may be added (e.g., may support the discontinuous filaments 120). As one example, the filament network 124 (and/or the filament layer 134) may include the plurality of chopped discontinuous filaments 120 dispersed into the thin film 154. The film 154 may include a thermoplastic substrate that extends the entire length or width of the composite structure 102. The discontinuous filaments 120 may include a plurality of chopped discontinuous filaments that do not extend the entire length or width of the composite structure 102. The discontinuous filaments 120 may be coupled to the film 154, for example, by use of a binder, by partially melting the film 154, or the like. The discontinuous filaments 120 added to the film 154 may include filaments of at least one of different sizes, different lengths, different diameters, different cross-sectional shapes and different types (e.g., material compositions) or some combination thereof. As one general, non-limiting example, discontinuous filaments 120 added to the film 154 may include at least one of different length filaments 126, different type filaments 128, or a combination of different length-different type filaments 126, 128.

The film 154 may include a plurality of holes or similar apertures (not shown) formed through the thermoplastic substrate. The holes may be suitably sized to allow the resin 108 to migrate or flow through the filament layer 134, if required, during integration of the resin 108 with fiber layer 118 and/or the reinforcement layup 110 for forming the composite structure 102.

One example configuration of the disclosed filament network 124 may include the film 154 and discontinuous filaments 120 having first length-first type filaments 126*a*, 128*a* (e.g., short, toughening filaments) and second length-second type filaments 126*b*, 128*b* (e.g., short, low melting point filaments). The filament network 124 illustrated in FIG. 7 may be one example of one implementation of the filament layer 134 of the number of filaments layers 114 (FIG. 1). As one example realization of the disclosed configuration of the filament network 124, the film 154 may support the dispersed discontinuous filaments 120 (e.g., the short, toughening filaments and the short, low melting point filaments) resulting in a stable connected network of discontinuous filaments 120. The resulting filament layer 134 having different length filaments 126 may have a low areal weight and sufficient filament ends 144 to achieve sufficient interpenetration with a neighboring filament layer 134 and/or fiber bundle 132 of the reinforcement layup 110 (FIG. 1). The resulting filament layer 134 having different type filaments 128 may have increased functional characteristics (e.g., improved toughness and the elimination of the binding material 122). The resulting filament layer 134 having different length-different type filaments 126,128 may have a low areal weight, sufficient filament ends 144 to achieve sufficient interpenetration with a neighboring filament layer 134 and/or fiber bundle 132 of the reinforcement layup 110, and increased functional characteristics.

Those skilled in the art will recognize that while only first length-first type filaments 126*a*, 128*a* and second length-second type filaments 126*b*, 128*b* are illustrated by example in FIG. 7, a plurality of different length-type combination of discontinuous filaments 120 (e.g., first length-first type filaments, second length-second type filaments, second length-first type filaments, third length-third type filaments, second length-fourth type filaments, etc., having various combinations of different lengths and/or types) may also be included in the discontinuous filaments 120 added to the film 154 forming the filament network 124 and/or the filament layer 134, without limitation.

Figure 8:
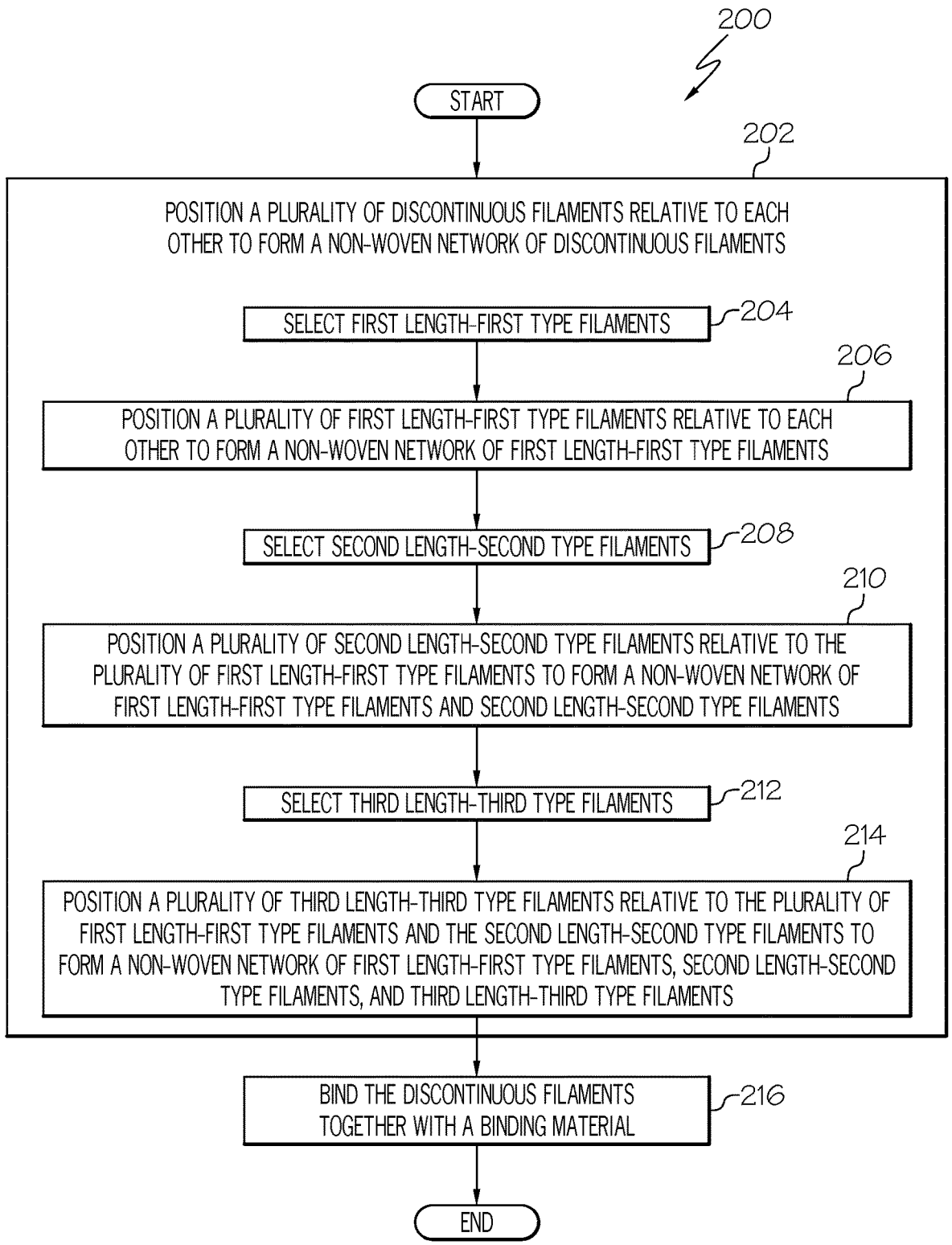
FIG. 8 is a flow diagram of one embodiment of the disclosed method for forming the filament network.

Referring to FIG. 8, one embodiment of the disclosed method, generally designated 200, for forming a filament network may include positioning a plurality of discontinuous filaments relative to each other to form a non-woven network of discontinuous filaments, as shown at block 202. The discontinuous filaments may include at least one of different length filaments and/or different type filaments. The discontinuous filaments may be one example of the discontinuous filaments 120, the different length filaments may be one example of the different length filaments 126, and the different type filaments may be one example of the different type filaments 128 (FIG. 1). The method 200 depicted in FIG. 8 may be implemented to form the filament layer 134 of the number of filament layers 114 (FIG. 1).

The method 200 may include selecting first length-first type filaments, as shown at block 204. A plurality of first length-first type filaments may be positioned relative to each other to form a non-woven network of first length-first type filaments, as shown at block 206.

Second length-second type filaments may be selected, as shown at block 208. The second length-second type filaments may have at least one of a length different than (e.g., shorter than) the length of the first length-first type filaments and/or a type different than the type of the first length-first type filaments. A plurality of second length-second type filaments may be positioned relative to the plurality of first length-first type filaments to form a non-woven network of first length-first type filaments and second length-second type filaments, as shown at block 210. The network of first length-first type filaments may support the second length-second type filaments and the second length-second type filaments may entangle with the first length-first type filaments.

Optionally, third length-third type filaments may be selected, as shown at block 212. The third length-third type filaments may have at least one of a length different than at least one of the length of the first length-first type filaments and/or the second length-second type filaments and/or a type different than the type of at least one of the first length-first type filaments and/or the second length-second type filaments. A plurality of third length-third type filaments may be positioned relative to the plurality of first length-first type filaments and the second length-second type filaments to form a non-woven network of first length-first type filaments, second length-second type filaments, and third length-third type filaments, as shown at block 214. The network of first length-first type filaments and second length-second type filaments may support the third length-third type filaments and the third length-third type filaments may entangle with the first length-first type filaments and the second length-second type filaments.

The length of the first length-first type filaments, the length of the second length-second type filaments, and the length of the third length-third type filaments may be selected to achieve at least one of a desired areal weight of the filament layer, a desired thickness of the filament layer, a sufficient stability of the filament layer, sufficient entanglement or bonded cross-over points between the first length-first type filaments, the second length-second type filaments, and the third length-third type filaments (e.g., a sufficient number of crossover points), and/or a sufficient number of filament ends of the first length-first type filaments, the second length-first type filaments, and the third length-third type filaments for penetration into at least one of a neighboring filament layer and/or a neighboring fiber bundle.

The type of the first length-first type filaments, the type of the second length-second type filaments, and the type of the third length-third type filaments may be selected to achieve at least one of various functional characteristics of the filament layer and/or a composite structure formed with the filament layer.

Optionally, the discontinuous filaments (e.g., the first length-first type filaments, the second length-second type filaments, and/or the third length-first type filaments) may be bound together with a binding material, as shown at block 216. The binding material used in the disclosed method 200 may be one example of the binding material 122 (FIG. 1).

One example method for producing the filament network may include combining all types of discontinuous filaments (e.g., different length filaments and/or different type filaments) into a homogenous dispersion and then processing via wet laid, dry laid or air laid non-woven sheet manufacture. As an example, wet laid may use between approximately 0.5 mm and 30 mm (e.g., long) filaments for making low areal weight filament layers (e.g., veils). As an example, dry laid may use between approximately 15 mm and 80 mm filaments for making high areal weight filament layers (e.g., veils). Another example method of producing the filament network may include sequentially forming homogenous mixtures containing some different length filaments and different type filaments via any of the wet/dry/air laid techniques and then laminating them together. Another example of producing the filament network may include sequentially forming multiple filament mixtures each containing some different length filaments and different type filaments via any of the wet/dry/air laid techniques and then laminating the multiple filament mixtures together to get a higher areal weight filament network or filament layer (e.g., veil) that may contain a different percent of filament types and/or filament lengths for each of the individual filament mixtures.

Figure 9:
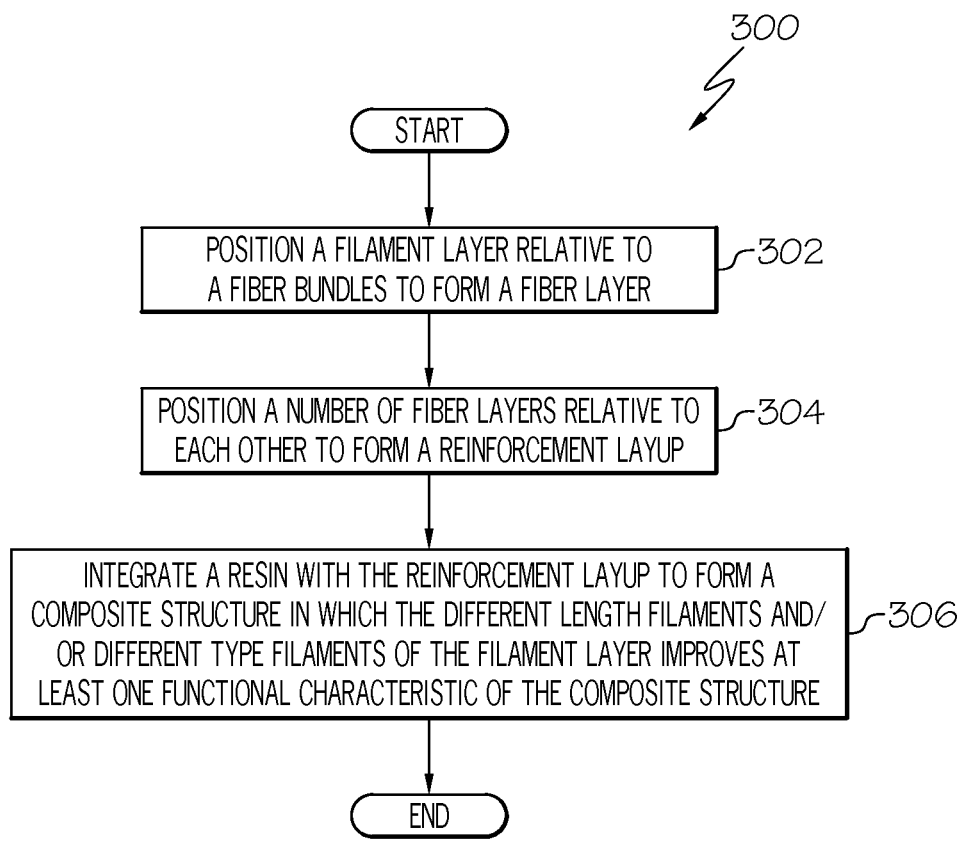
FIG. 9 is a flow diagram of one embodiment of the disclosed method for forming the composite structure.

Referring to FIG. 9, one embodiment of the disclosed method, generally designated 300, for forming a composite structure may begin by positioning a filament layer relative to fiber bundles to form a fiber layer, as shown at block 302. The filament layer may be one example of the filament layer 134, the fiber bundle may be one example of the fiber bundles 132, and the fiber layer may be one example of the fiber layer 118 (FIG. 1). As one example, a number of filament layers and a number of fiber bundles may be positioned relative to each other to form the fiber layer. A number of fiber layers may be positioned relative to each other to form a reinforcement layup, as shown at block 304. The reinforcement layup may be one example of the reinforcement layup 110 (FIG. 1). The reinforcement layup may be used to form the composite structure. The method 300 depicted in FIG. 9 may be implemented to form the composite structure 102 (FIG. 1).

One non-limiting example method for producing the reinforcement layup (and/or the composite structure) may involve mechanical, thermal, or chemical binding of one or more filament layers to one or more fiber bundles (e.g., a unidirectional tow, a unidirectional tape, a woven fabric, a noncrimp fabric, a braided shape, etc.) prior to layup on a preform or tool. Another non-limiting example method for producing the reinforcement layup (and/or the composite structure) may involve layup of a fiber bundle (e.g., unidirectional tow, unidirectional tape, woven fabric, noncrimp fabric, braided shape, etc.) on a preform or tool and then mechanically, thermally or chemically binding a filament layer to a surface of the fiber bundle (e.g., on top of the fiber bundle). Another non-limiting example method for producing the reinforcement layup (and/or the composite structure) may involve layup of a fiber bundle (e.g., unidirectional tow, unidirectional tape, woven fabric, noncrimp fabric, braided shape, etc.) on a preform, tool or other structural form and then mechanically, thermally, or chemically binding loose chopped discontinuous filaments to the fiber bundle to form a filament layer. In the above examples each fiber layer may or may not contain a filament layer (e.g., the fiber layer may include at least one fiber layer and at least one filament layer, at least one fiber bundle, or at least one filament layer). Further to the above examples, when multiple fiber layers contain filament layers, these filament layers may or may not contain different combinations of filament lengths and/or filament types such that each fiber layer may possess different filament layer functionalities (e.g., functional characteristics).

As shown at block 306, a resin may be integrated with the reinforcement layup to form the composite structure in which the different length filaments and/or different type filaments of the filament layer improves at least one functional characteristic of the composite structure. The composite structure may be left uncured, partially cured, or fully cured, depending on the implementation.

Figure 10:
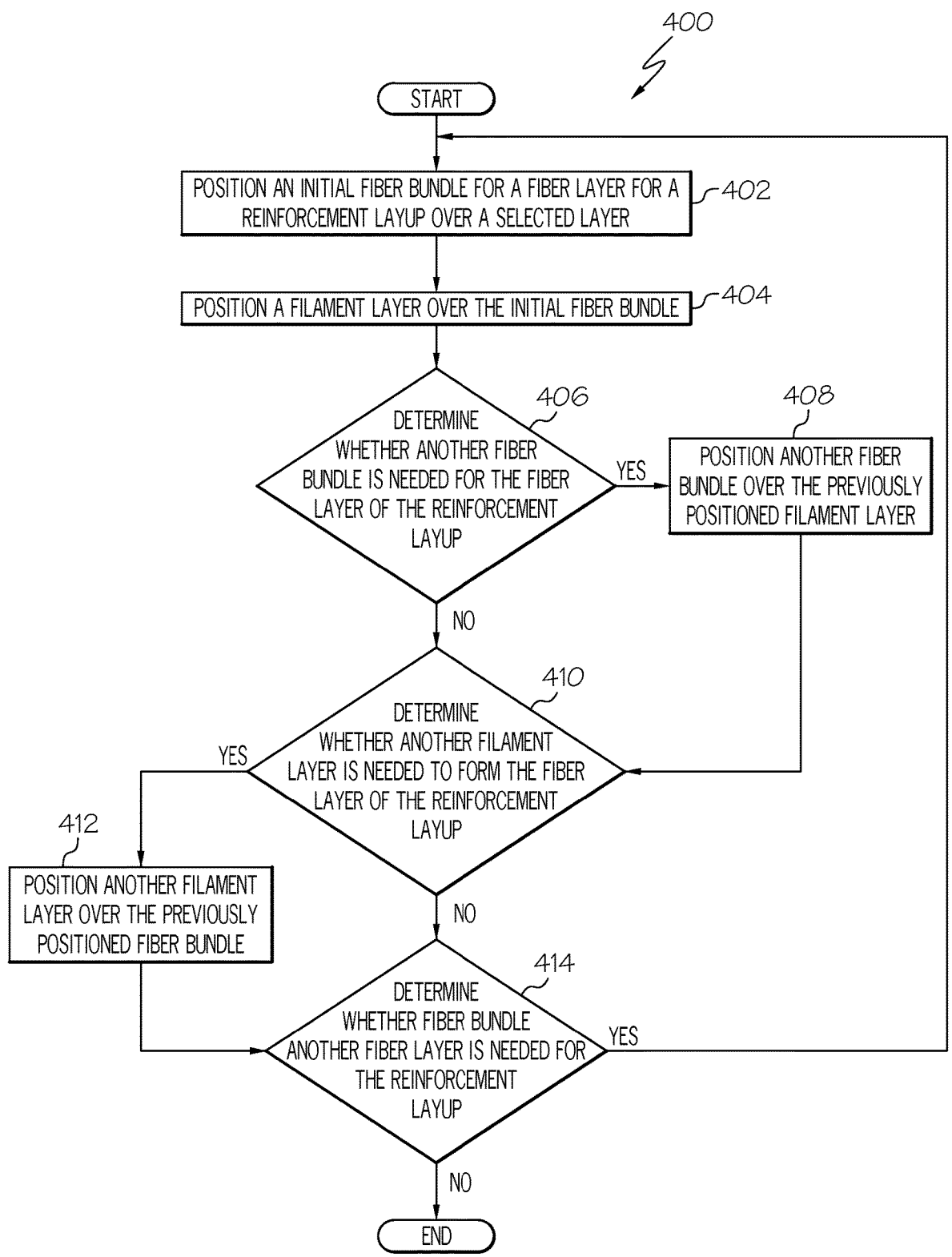
FIG. 10 is a flow diagram of one embodiment of the disclosed method for forming the reinforcement layup.

Referring to FIG. 10, one embodiment of the disclosed method, generally designated 400, for forming a reinforcement layup may begin by positioning an initial fiber bundle for a fiber layer for a reinforcement layup over a selected layer, as shown at block 402. The first time that operation shown at block 402 is performed, the selected layer is the surface of a tooling apparatus, such as a mold. Any subsequent times that operation shown at block 402 is performed, the selected layer may be the previous fiber layer formed. The method 400 may be implemented to form the composite structure 102 (FIG. 1).

As shown at block 404, a filament layer may be positioned over the initial fiber bundle (block 402). The filament layer may be positioned over the initial fiber bundle such that the filament layer covers at least a portion of an exterior surface of the initial fiber bundle. The fiber bundle and filament layer may form a fiber layer of the reinforcement layup.

At least one fiber bundle and at least one filament layer may form a fiber layer of the reinforcement layup.

Thereafter, a determination may be made as to whether another fiber bundle is needed for the fiber layer of the reinforcement layup, as shown at block 406. If an additional fiber bundle is needed, another fiber bundle may be positioned over the previously positioned filament layer, as shown at block 408. As one example, another fiber bundle may be positioned over the previously positioned filament layer (block 404) and, optionally, the selected layer such that a portion of the next fiber bundle covers at least a portion of the filament layer and, optionally, a portion of the selected layer. After another fiber bundle is positioned over the filament layer, a determination may be made as to whether any more filament layers are needed to form the fiber layer of the reinforcement layup, as shown at block 410.

Additionally, if an additional filament bundle is not needed (block 406), the determination may be made as to whether another filament layer is needed to form the fiber layer of the reinforcement layup, as shown at block 410. If an additional filament layer is needed, another filament layer may be positioned over the previously positioned fiber bundle, as shown at block 412. As one example, another filament layer may positioned over the previously positioned fiber bundle (block 408) such that at least a portion of the next filament layer covers at least a portion of the previously positioned fiber bundle.

Thereafter, a determination may be made as to whether another fiber layer is needed for the reinforcement layup, as shown at block 414. If any additional fiber layers are needed to form the reinforcement layup, the method returns to the operation shown at block 402, as described above. If no additional filament layers are needed to form the reinforcement layup, the method may terminate.

Resin may be infused within the reinforcement layup to form an integrated preform. The integrated preform may then be cured to form a composite structure, such as a single layer composite or a multiple layer composite laminate.

Those skilled in the art will recognize that in other example implementations of the disclosed embodiments, the operations shown in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks of the block diagram.

Figure 11:
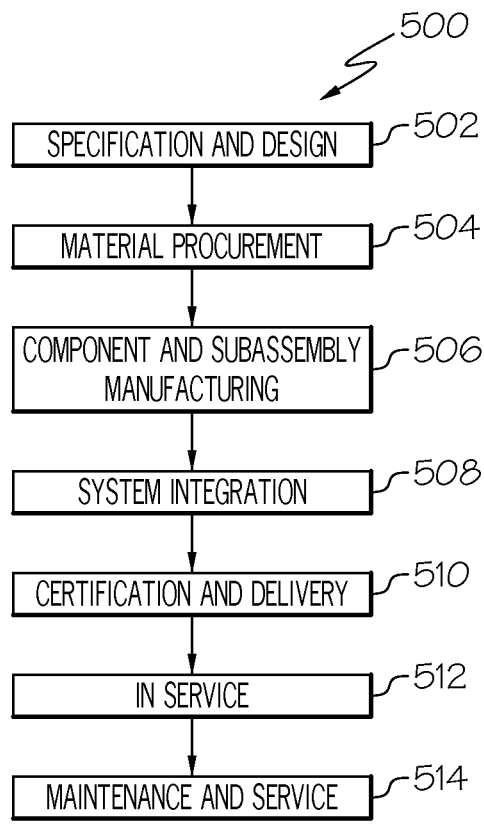
FIG. 11 is a block diagram of aircraft production and service methodology.
Figure 12:
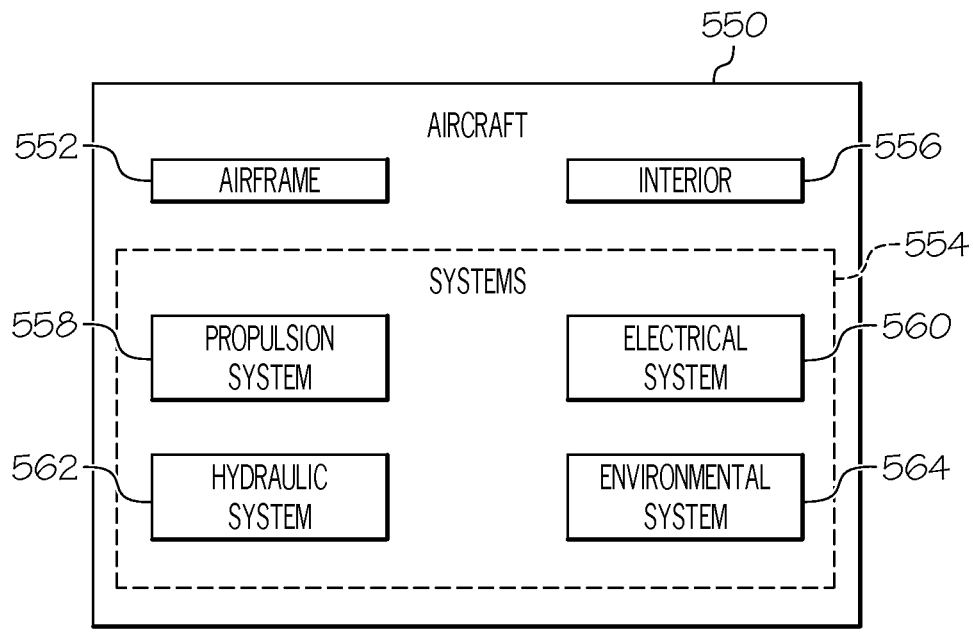
FIG. 12 is a schematic block diagram of an aircraft.

Examples of the present disclosure may be described in the context of an aircraft manufacturing and service method 500 as shown in FIG. 11 and an aircraft 550 as shown in FIG. 12. During pre-production, the illustrative method 500 may include specification and design, as shown at block 502, of the aircraft 550 and material procurement, as shown at block 504. During production, component and subassembly manufacturing, as shown at block 506, and system integration, as shown at block 508, of the aircraft 550 may take place. Thereafter, the aircraft 550 may go through certification and delivery, as shown block 510, to be placed in service, as shown at block 512. While in service, the aircraft 550 may be scheduled for routine maintenance and service, as shown at block 514. Routine maintenance and service may include modification, reconfiguration, refurbishment, etc. of one or more systems of the aircraft 550.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, the aircraft 550 produced by illustrative method 500 may include airframe 552 with a plurality of high-level systems 554 and an interior 556. Examples of high-level systems 554 include one or more of a propulsion system 558, an electrical system 560, a hydraulic system 562, and an environmental system 564. Any number of other systems may be included. Although an aerospace example is shown, the principles disclosed herein may be applied to other industries, such as the automotive and marine industries. Accordingly, in addition to the aircraft 550, the principles disclosed herein may apply to other vehicles (e.g., land vehicles, marine vehicles, space vehicles, etc.).

The apparatus and methods shown or described herein may be employed during any one or more of the stages of the manufacturing and service method 500. For example, components or subassemblies corresponding to component and subassembly manufacturing (block 506) may be fabricated or manufactured in a manner similar to components or subassemblies produced while aircraft 550 is in service (block 512). Also, one or more examples of the apparatus, method, or combination thereof may be utilized during production stages (blocks 506 and 508), for example, by decreasing the weight of the material of aircraft 550 and/or increasing the functionality of the material of aircraft 550. Similarly, one or more examples of the apparatus or method realizations, or a combination thereof, may be utilized, for example and without limitation, while aircraft 550 is in service, for example, maintenance and service stage (block 514).

Accordingly, the disclosed apparatus and methods may be used to produce composite structures having at least one of low areal weights, low thicknesses and/or increased functional characteristics by utilizing a number of filament layers formed from discontinuous fibers having at least one of different lengths and/or different types.

Although various embodiments of the disclosed apparatus and methods have been shown and described, modifications may occur to those skilled in the art upon reading the specification. The present application includes such modifications and is limited only by the scope of the claims.

What is claimed is:

1. A fiber layer comprising:
   a pair of layers of reinforcement material, said reinforcement material comprising a plurality of fiber bundles of continuous reinforcing fibers; and
   an interlayer disposed between and coupled to said pair of layers of said reinforcement material, said interlayer comprising a filament network comprising:
      first discontinuous filaments, said first discontinuous filaments comprising a polymeric material having a first length between 15 micrometers and 15 millimeters and a melting temperature between 50° C. and 175° C.;
      second discontinuous filaments entangled with said first discontinuous filaments, said second discontinuous filaments comprising a stiff material having a second length between 30 millimeters and 100 millimeters and a melting temperature greater than 175° C.; and
      third discontinuous filaments entangled with said first discontinuous filaments and said second discontinuous filaments, said third discontinuous filaments comprising a functional material having a third length between 15 millimeters and 30 millimeters and a melting temperature greater than 175° C.; and
   wherein:
      said first discontinuous filaments and said third discontinuous filaments are positioned so that filament ends of a portion of said first discontinuous filaments and a portion of said third discontinuous filaments at least partially penetrate said plurality of fiber bundles of said pair of layers of said reinforcement material;
      said first discontinuous filaments provide for thermal bonding of said filament network and said pair of layers of said reinforcement material when melted;
      said second discontinuous filaments provide for mechanical strength and stability of said fiber layer; and
      said functional material of said third discontinuous filaments imparts at least one functional characteristic to said fiber layer.

2. The fiber layer of claim 1 wherein said filament network comprises 25 percent by weight of said first discontinuous filaments, 50 percent by weight of said second discontinuous filaments, and 25 percent by weight of said third discontinuous filaments.

3. The fiber layer of claim 1 wherein said at least one functional characteristic comprises toughness, stiffness, flame resistance, surface area, and conductivity.

4. The fiber layer of claim 1 wherein said filament network further comprises continuous filaments, and wherein said first discontinuous filaments, said second discontinuous filaments, said third discontinuous filaments, and said continuous filaments are entangled together within said filament network.

5. The fiber layer of claim 1 wherein:
   said filament network further comprises a permeable film;
   said first discontinuous filaments, said second discontinuous filaments, and said third discontinuous filaments are dispersed in said film; and
   said film is arranged between said pair of layers of said reinforcement material so that said filament ends of said first discontinuous filaments and said third discontinuous filaments at least partially penetrate said plurality of fiber bundles of said pair of layers of said reinforcement material.

6. The fiber layer of claim 1 further comprising a resin infused through said interlayer, comprising said filament network, and said pair of layers of said reinforcement material, wherein said resin permeates entirely through said interlayer, comprising said filament network, and said pair of layers of said reinforcement material.

7. The fiber layer of claim 1 wherein said filament network further comprises a binder to bind said first discontinuous filaments, said second discontinuous filaments, and said third discontinuous filaments together.

8. The fiber layer of claim 1 wherein said first discontinuous filaments cross over said second discontinuous filaments and said third discontinuous filaments cross over said second discontinuous filaments.

9. The fiber layer of claim 1 wherein said polymeric material of said first discontinuous filaments comprises at least one of polyolefin, polyurethane, and thermoplastic.

10. The fiber layer of claim 1 wherein said stiff material of said second discontinuous filaments comprises at least one of carbon, glass, metal, and ceramic.

11. The fiber layer of claim 1 wherein:
said functional material of said third discontinuous filaments comprises at least one of carbon, polyether ether ketone, polyimide, nylon, and polyurethane; and
said at least one functional characteristic comprises toughness.

12. The fiber layer of claim 1 wherein:
said functional material of said third discontinuous filaments comprises at least one of polyimide, polybenzoxazole, polybenzimidazole, polybenzthiazole, polybenzoxazine, ceramic, and glass; and
said functional characteristic comprises flame resistance.

13. The fiber layer of claim 1 wherein:
said functional material of said third discontinuous filaments comprises at least one of carbon and metal; and
said functional characteristic comprises electrical conductivity.

14. The fiber layer of claim 1 wherein said filament network comprises a thickness of between 0.1 microns and 50 microns.

15. The fiber layer of claim 1 wherein:
said functional material of said third discontinuous filaments comprise a first type and a second type, different than said first type;
said first type comprises a first material composition imparting a first functional characteristic to said fiber layer; and
said second type comprises a second material composition, different than said first material composition, imparting a second functional characteristic, different than said first functional characteristic, to said fiber layer.

16. The fiber layer of claim 15 wherein said functional material of said third discontinuous filaments further comprise a third type, different than said first type and said second type, and wherein said third type comprises a third material composition, different than said first material composition and said second material composition, imparting a third functional characteristic, different than said first functional characteristic and said second functional characteristic, to said fiber layer.

17. The fiber layer of claim 1 further comprising:
a plurality of layers of said filament network; and
a plurality of layers of said reinforcement material,
wherein said plurality of layers of said filament network and said plurality of layers of said reinforcement material are arranged in an alternating stacked configuration such that each one of said plurality of layers of said filament network forms an interlayer between adjacent ones of said plurality of layers of said reinforcement material.

18. The fiber layer of claim 17 wherein each one of said plurality of layers of said filament network comprises a thickness of between 0.1 microns and 50 microns.

19. The fiber layer of claim 7 further comprising a resin infused through said interlayer, comprising said filament network, and said pair of layers of said reinforcement material.

20. A reinforcement layup comprising:
a plurality of said fiber layers of claim 1 arranged in a stacked configuration; and
at least one interlayer disposed between adjacent fiber layers.

* * * * *